(12) United States Patent
Tezawa et al.

(10) Patent No.: US 8,226,338 B2
(45) Date of Patent: Jul. 24, 2012

(54) TIP SHAPING APPARATUS

(75) Inventors: Kazuhiro Tezawa, Nagoya (JP);
Takanori Niwa, Kariya (JP)

(73) Assignees: Kyokutoh Co., Ltd., Aichi (JP);
Kabushiki Kaisha Toyota Jidoshikki,
Aichi (JP)

( * ) Notice: Subject to any disclaimer, the term of this
patent is extended or adjusted under 35
U.S.C. 154(b) by 0 days.

(21) Appl. No.: 12/734,807

(22) PCT Filed: Aug. 27, 2009

(86) PCT No.: PCT/JP2009/064975
§ 371 (c)(1),
(2), (4) Date: Jul. 21, 2010

(87) PCT Pub. No.: WO2010/024340
PCT Pub. Date: Mar. 4, 2010

(65) Prior Publication Data
US 2011/0146363 A1     Jun. 23, 2011

(30) Foreign Application Priority Data
Sep. 1, 2008   (JP) .................................. 2008-223969

(51) Int. Cl.
*B23B 5/16*     (2006.01)
(52) U.S. Cl. ............. 409/140; 409/139; 29/33 A; 72/67;
72/112; 72/126
(58) Field of Classification Search ................ 72/67, 70,
72/71, 112, 118, 126; 409/139, 140, 138;
29/33 A, 50, 6.5, 564
See application file for complete search history.

(56) References Cited

U.S. PATENT DOCUMENTS
2,951,425 A * 9/1960 Eger .............................. 409/138
(Continued)

FOREIGN PATENT DOCUMENTS
JP             52-35392 A       3/1977
(Continued)

OTHER PUBLICATIONS

International Search Report of the International Searching Authority mailed on Nov. 17, 2009 for the corresponding international patent application No. PCT/JP2009/064975 (English translation enclosed).

*Primary Examiner* — Bena Miller
(74) *Attorney, Agent, or Firm* — Posz Law Group, PLC

(57) ABSTRACT

A tip shaping apparatus presses electrode tips against a shaping roller thereof held by a rotationally driven holder in such a manner as to bring tip sections of the tips close to each other, thereby shaping the tip sections into reusable condition. The tip shaping apparatus includes deburring sections located in such positions as to confront burrs that are formed during shaping in such a manner as to project from outer circumferences of root sections proximate the tip sections of the electrode tips in a direction perpendicular to the axes of the electrode tips, at ejection of the electrode tips from the apparatus. Each of the deburring sections is located proximate an outer circumferential plane of the root section of each of the electrode tips undergoing shaping so as to abut against and cut off or bend the burrs in such a manner as to suppress the projecting height of the burrs when the electrode tips are ejected from the tip shaping apparatus.

11 Claims, 24 Drawing Sheets

U.S. PATENT DOCUMENTS

| | | | |
|---|---|---|---|
| 4,966,506 A * | 10/1990 | Slanker | 409/140 |
| 5,146,670 A * | 9/1992 | Jones | 29/561 |
| 5,277,529 A * | 1/1994 | Anders et al. | 409/131 |
| 5,993,125 A * | 11/1999 | Shimada | 409/140 |
| 6,722,004 B2 * | 4/2004 | Recupero | 29/33 R |
| 7,257,872 B2 * | 8/2007 | Shim | 29/33 K |
| 2002/0044847 A1 * | 4/2002 | Yajima et al. | 409/140 |
| 2003/0041428 A1 * | 3/2003 | Recupero | 29/33 R |
| 2009/0191014 A1 * | 7/2009 | Dupuy et al. | 408/1 R |

FOREIGN PATENT DOCUMENTS

| | | |
|---|---|---|
| JP | 3021396 U | 11/1995 |
| JP | 11-90647 A | 4/1999 |
| JP | 2005-945 A | 1/2005 |
| JP | 2006-88222 A | 4/2006 |
| JP | 2006-239753 A | 9/2006 |
| JP | 2007-90427 | 4/2007 |

* cited by examiner

TIP SHAPING APPARATUS

CROSS REFERENCE TO RELATED APPLICATIONS

This application is a U.S. national stage application of PCT/JP2009/064975 filed on Aug. 27, 2009, and claims priority to, and incorporates by reference, Japanese Patent Application No. 2008-223969 filed on Sep. 1, 2008.

TECHNICAL FIELD

The present invention relates to a tip shaping apparatus that forms and shapes a pair of electrode tips carried by a welding gun for use in spot welding while producing as less grinding swarf as possible, and more particularly, to a tip shaping apparatus that removes burrs produced on the electrode tips during shaping.

BACKGROUND

Frequent use of electrode tips for use in spot welding or the like causes deformation of tip sections of the electrode tips, thereby compelling stopping of welding operation. A tip shaping apparatus is known in Patent Literature 1 shaping electrode tips into reusable condition by applying plastic deformation to deformed tip sections of electrode tips rather than by cutting which would produce cutting or grinding swarf. The electrode tip used in Patent Literature 1 includes a columnar root section and a tip section, and the tip section includes a leading end surface that contacts with a workpiece and an enlarging surface that enlarges from the leading end surface toward the root section.

The above tip shaping apparatus is constructed to shape the leading end surfaces and the enlarging surfaces of electrode tips in order to correct changes of shape and area of the leading end surfaces due to abrasion or the like. To this end, the tip shaping apparatus includes a holder that is driven rotationally and is coaxial with axes of electrode tips coming close to each other, a plurality of shaping rollers held by the holder and each of which is provided with a shaping surface and a cutting section having a cutting blade that cuts vicinities of the leading end surfaces of electrode tips.

When the above tip shaping apparatus is used, a pair of electrode tips carried by a welding gun are moved toward the interior of the holder while being brought close to each other, and pressed against the shaping rollers and the cutting section. Then the shaping rollers rotate about the axes of the electrode tips together with the holder and apply the shaping surfaces to the tip sections of the electrode tips, thereby shaping the enlarging surfaces. In the meantime, the cutting section cuts the leading end surfaces and vicinities of edges of the leading end surfaces by the cutting blades. Thus the conventional tip shaping apparatus shapes the tip sections of electrode tips with high accuracy.

PRIOR ART LITERATURE

Patent Literature 1: JP2007-90427

However, the above conventional tip shaping apparatus produces a burr on the area of an electrode tip extending from the tip section to the root section by applying the shaping rollers to the electrode tip, i.e. a burr that is comprised of material of the electrode tip itself extended from the enlarging surface and protrudes toward a direction perpendicular to the axis from the circumference of the tip section near the root section. This burr is formed all around the electrode tip. If the electrode tip is used for welding while having a burr thereon, the burr is likely to engage with a vertical wall section of a workpiece proximate the welding area and damage the workpiece. Moreover, if the burr contacts the workpiece, an electric current for welding passes through the burr in a furcate manner, which precludes a desired welding and causes welding failure.

SUMMARY

The present invention contemplates to solve the problem described above, and has an object to provide a tip shaping apparatus that shapes leading ends of electrode tips into reusable condition while removing burrs generated on root sections of the electrode tips proximate the leading ends.

The tip shaping apparatus of the invention is used to shape a pair of electrode tips carried at root sections thereof by a welding gun for use in spot welding, each of which electrode tips being columnar in shape and including on a tip section a circular leading end surface for contact with a workpiece to be welded and an enlarging surface extending from an edge of the leading end surface to the root section while enlarging. The tip shaping apparatus includes a rotatable holder coaxial with the electrode tips and a shaping roller that is held by the holder and includes a shaping surface against which the tip section of the electrode tip is pressed to be shaped while the holder rotates.

The tip shaping apparatus further includes a deburring section that is located, when the electrode tip is ejected after shaping operation, on a position confronting a burr formed on the electrode tip in such a manner as to project from an outer circumference of the root section of the electrode tip proximate the tip section toward a direction perpendicular to an axis of the electrode tip.

The deburring section is located proximate the outer circumference of the root section of the electrode tip undergoing shaping so as to contact with and cut off or bend the burr for suppressing a height of the burr from the outer circumference of the root section at the ejection of the electrode tip.

When a pair of electrode tips carried by the welding gun are brought close to each other and inserted into the tip shaping apparatus of the invention, and pressed against the shaping roller while the holder rotates, the shaping roller rotates in a circumferential direction of the electrode tips together with the holder as the tips are pressed against the shaping surfaces, and thus shapes the tip sections of the electrode tips after the shapes of the shaping surfaces.

Since the shaping roller is pressed against the tip sections of the electrode tips, the tip sections are plastically deformed and superfluous material of the electrode tips are shoved toward the outer circumferences of the tip sections proximate the root sections. Thus a burr is formed on the outer circumference of the root section of each of the electrode tips proximate the tip section in such a manner as to project outwardly, in a direction perpendicular to the axis, from the outer circumferential plane of the tip section (i.e. enlarging surface). When the electrode tips are ejected from the tip shaping apparatus, the burrs pass through the deburring sections located proximate the outer circumferences of the root sections of the electrode tips and on such positions as to confront the burrs. Thus the deburring sections contact with the burrs and cut off or bend the burrs in such a manner as to suppress the height of the burrs from the outer circumferences of the root sections of the electrode tips.

As described above, the tip shaping apparatus of the invention shapes electrode tips deformed after predetermined number of times of use into reusable condition and further removes burrs when the electrode tips are ejected from the shaping surfaces of the shaping rollers. Therefore, the tip shaping apparatus of the invention increases production efficiency and eliminates the fear that burrs engage with a vertical wall section of a workpiece proximate the welding area and damage the workpiece and that an electric current passing through the burrs causes welding failure.

It is desired that a plurality of the shaping rollers are located around a rotational central axis of the holder so as to be rotatable about a rotation axis extending in parallel to the rotational central axis of the holder and that each of the shaping rollers is formed into a generally barrel-like shape in which the shaping surfaces are gradually reduced in diameter toward opposite ends in an axial direction of the rotation axis so as to shape the tip sections of both of the electrode tips.

With this configuration, more than one shaping rollers located around the electrode tips support the electrode tips and shape the electrode tips quickly without wobbling the tips. In this case, it will also be appreciated to so configure that one roller out of the shaping rollers serves as a main shaping roller for shaping tip sections of electrode tips mainly while other rollers serve as support rollers for mainly supporting the electrode tips in cooperation with the main shaping roller and conducting shaping secondarily.

The tip shaping apparatus of the invention may include a cutter held by the holder and including a cutting blade that cuts vicinities of the leading end surfaces of both of the electrode tips while the holder rotates.

With this configuration, in shaping operation of the tip sections of the electrode tips, the cutting blades cut the leading end surfaces and vicinities of the edges of the leading end surfaces proximate the enlarging surfaces of the electrode tips, such that the leading end surfaces and edges of the electrode tips are shaped into predetermined shapes with high accuracy.

The deburring section of the tip shaping apparatus of the invention may be formed on the shaping roller. In this case, if the apparatus includes more than one shaping rollers around the rotational central axis of the holder, the deburring section is desirably formed on both ends of each of the shaping rollers in such a manner as to project from the outer circumference of the shaping roller in a flange-like fashion.

With the tip shaping apparatus provided with more than one shaping rollers each having the deburring sections as described above, the deburring sections support the electrode tips when removing burrs. That is, the apparatus will prevent wobbling of the electrode tips. Further, using more than one deburring sections will enable quick removal of burrs formed on the entire circumferences of the electrode tips.

In such an instance where the shaping roller is provided with flange-like deburring sections as described above, it will be appreciated that the outer circumferential plane of each of the deburring sections includes a tapered surface that enlarges in diameter toward a direction of insertion of the electrode tip and an acute edge located on a side of the direction of tip insertion.

The deburring sections with such tapered surfaces will guide the electrode tips at insertion into the tip shaping apparatus and prevent wobbling of the electrode tips. Further, this configuration will make it easier to cut and remove burrs by the acute edges of the deburring sections upon ejection of the electrode tips from the tip shaping apparatus.

A flange-like deburring section may include on the outer circumference a grinding surface having concavity and convexity. This configuration will enable the deburring section to cut off or bend a burr by the grinding surface at ejection of electrode tips from the tip shaping apparatus, thereby facilitating removal of burrs.

In such an instance where the deburring sections are formed on the shaping roller, the shaping roller may be comprised of a roller body provided with the shaping surfaces and the deburring sections prepared separate from the roller body and assembled with the roller body. Alternatively, the deburring sections may be integral with the roller body. If separate deburring sections are assembled with the roller body, the deburring sections will be replaceable. If the deburring sections are integral with the roller body, number of parts of the shaping roller will be reduced and mounting of the shaping roller on the holder will be facilitated. Further, this configuration will provide a concentric arrangement of the deburring sections and shaping surfaces with high allocation accuracy and durability, and keep the deburring sections arranged along the axial direction of the shaping roller in a steady fashion.

In the instance where the deburring sections are integral with the shaping roller, it is desired that the shaping roller includes on the outer circumferences proximate the deburring sections on the side of the shaping surfaces grooves that recess toward the rotation axis relative to hypothetical extensions of the shaping surfaces extending toward opposite ends of the shaping rollers. This configuration will facilitate the process to make the edges of the deburring sections for contact with burrs angular when forming the deburring sections by cutting, so that the resection and removal of burrs will be facilitated. Moreover, the grooves will once accommodate scrapes cut off from burrs so they may be evacuated therefrom after ejection of the electrode tips, and therefore, scrapes are evacuated smoothly without damaging the electrode tips.

In the instance where the tip shaping apparatus includes a cutter, the deburring sections may be formed on the cutter. Furthermore, the deburring sections may be formed on the holder.

DETAILED DESCRIPTION

Figure 1:
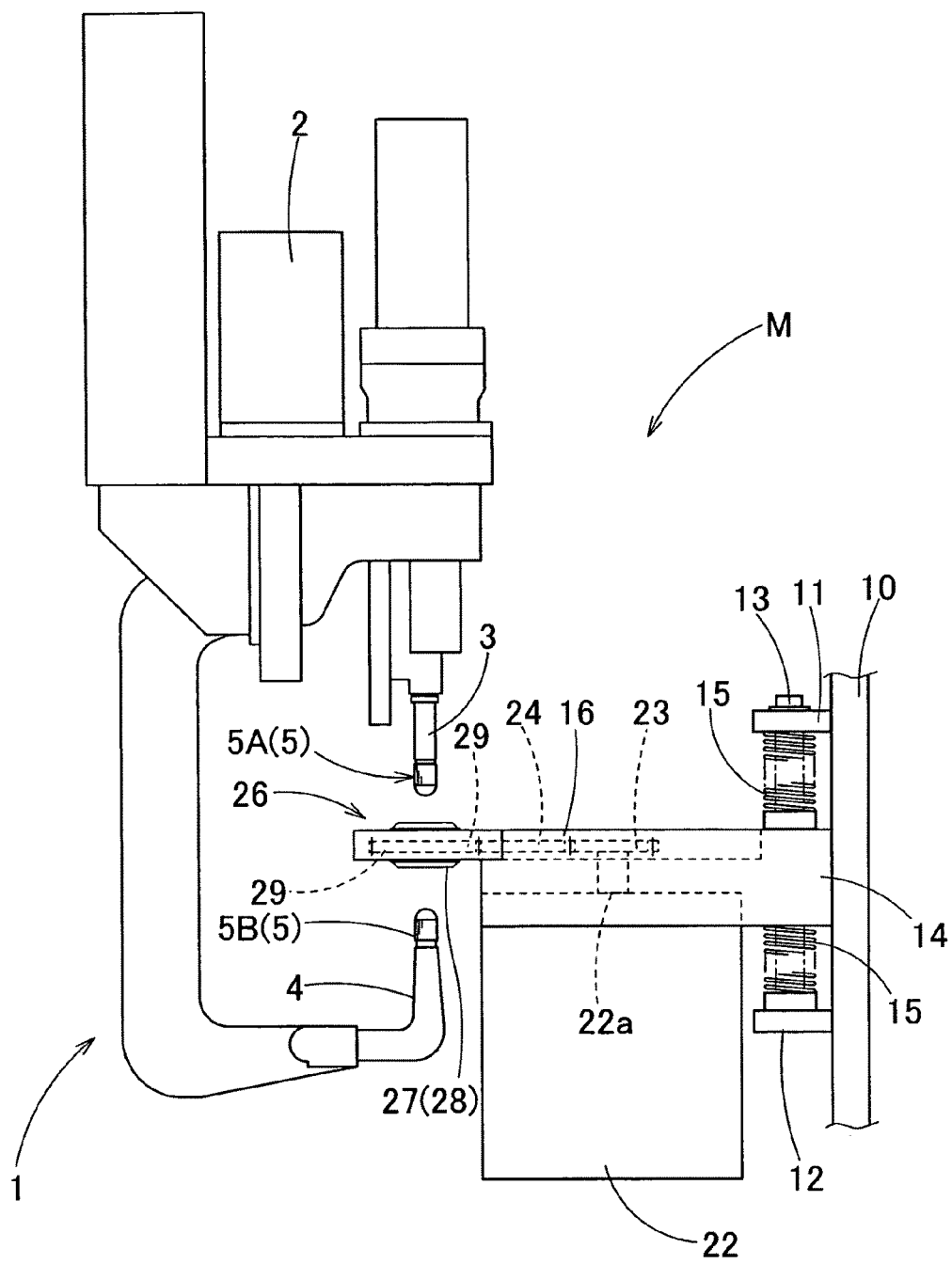
FIG. 1 is a partial side view of a tip shaping apparatus embodying the invention.
Figure 3:
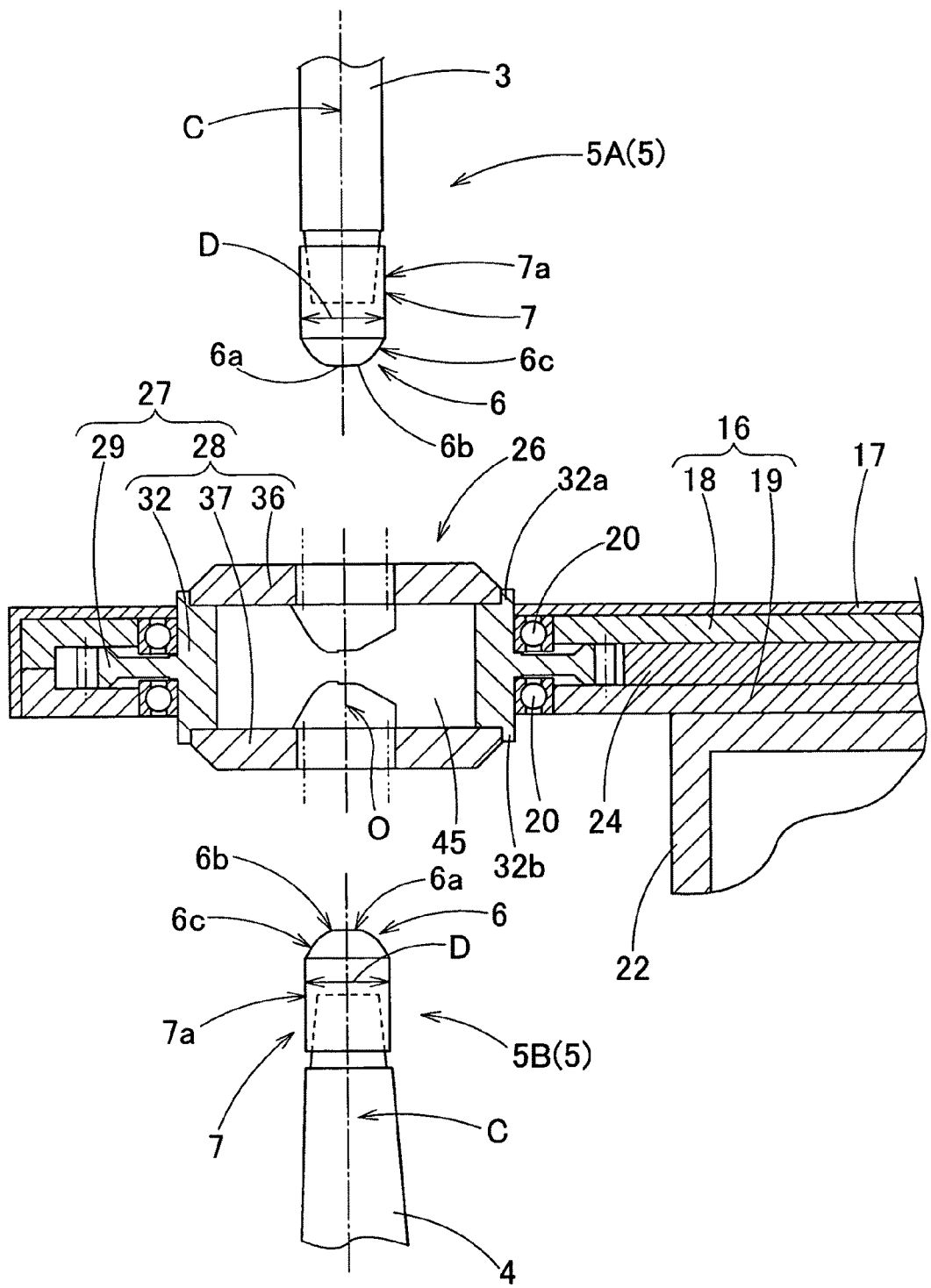
FIG. 3 is a schematic vertical section of a major portion of the tip shaping apparatus taken along line III-III of FIG. 5.
Figure 4:
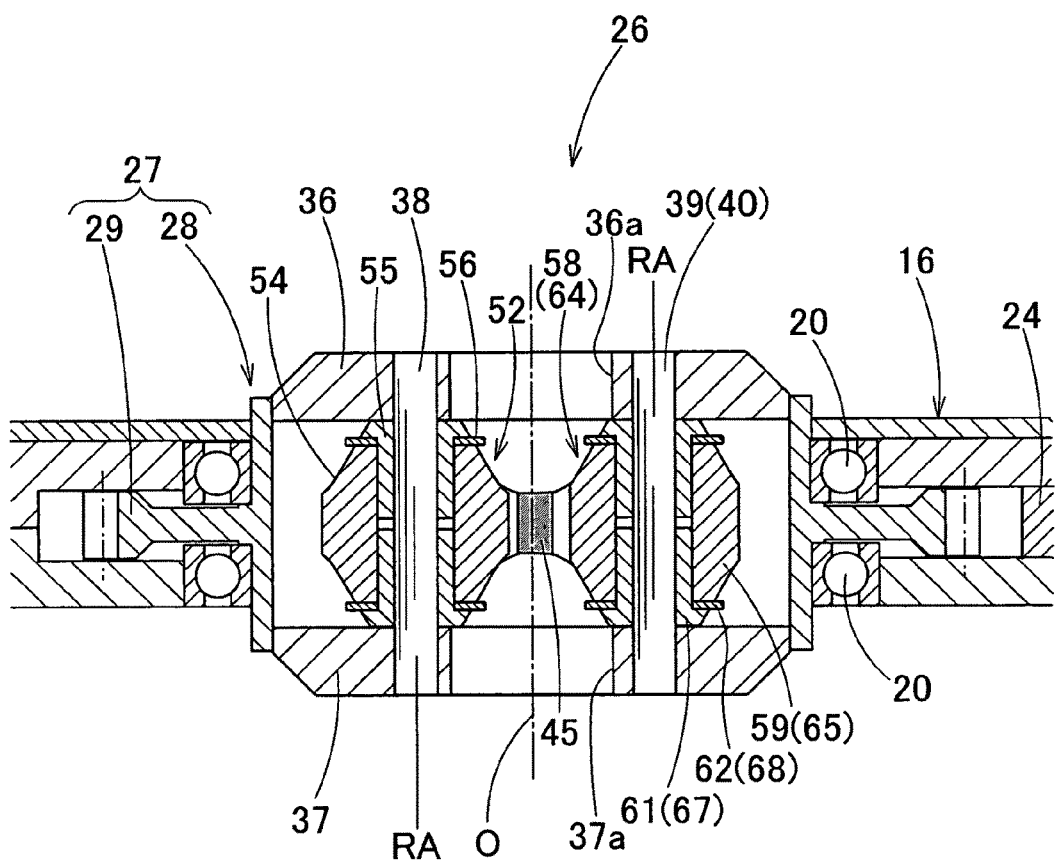
FIG. 4 is a schematic vertical section of the major portion of the tip shaping apparatus taken along line IV-IV of FIG. 5.

An embodiment of the present invention is described below with reference to the accompanying drawings. As shown in FIGS. 1 and 3, a tip shaping apparatus M embodying the invention is used for forming and shaping a pair of electrode tips 5 (5A, 5B) fitted in shanks 3 and 4 of a welding gun 1. The welding gun 1 is a servo gun held at the leading end of an arm of an unillustrated multi-joint welding robot. The servo gun 1, being general-purpose, holds the electrode tips 5A and 5B movably by a servo motor 2 having an encoder and has a position control function that approximates the tips 5A and 5B to each other. The servo gun 1 also has an arithmetic function that enables control of number of revolutions and torque control of the servo motor 2 as well as position control, welding force control or the like of the electrode tips 5A and 5B.

Each of the electrode tips 5A and 5B includes a tip section 6 for contact with a workpiece to be welded and a root section 7 which is columnar in shape and connected to and held by the shank 3/4. The tip section 6 includes a leading end surface 6a which is circular in shape and an enlarging surface 6c which extends from an edge (corner) 6b of the leading end surface 6a and enlarges toward the root section 7. In this embodiment, the leading end surface 6a is generally flat spherical surface while the enlarging surface 6c is spherical. The diameter D of the root section 7 is 16 mm (refer to FIG. 3).

Figure 2:
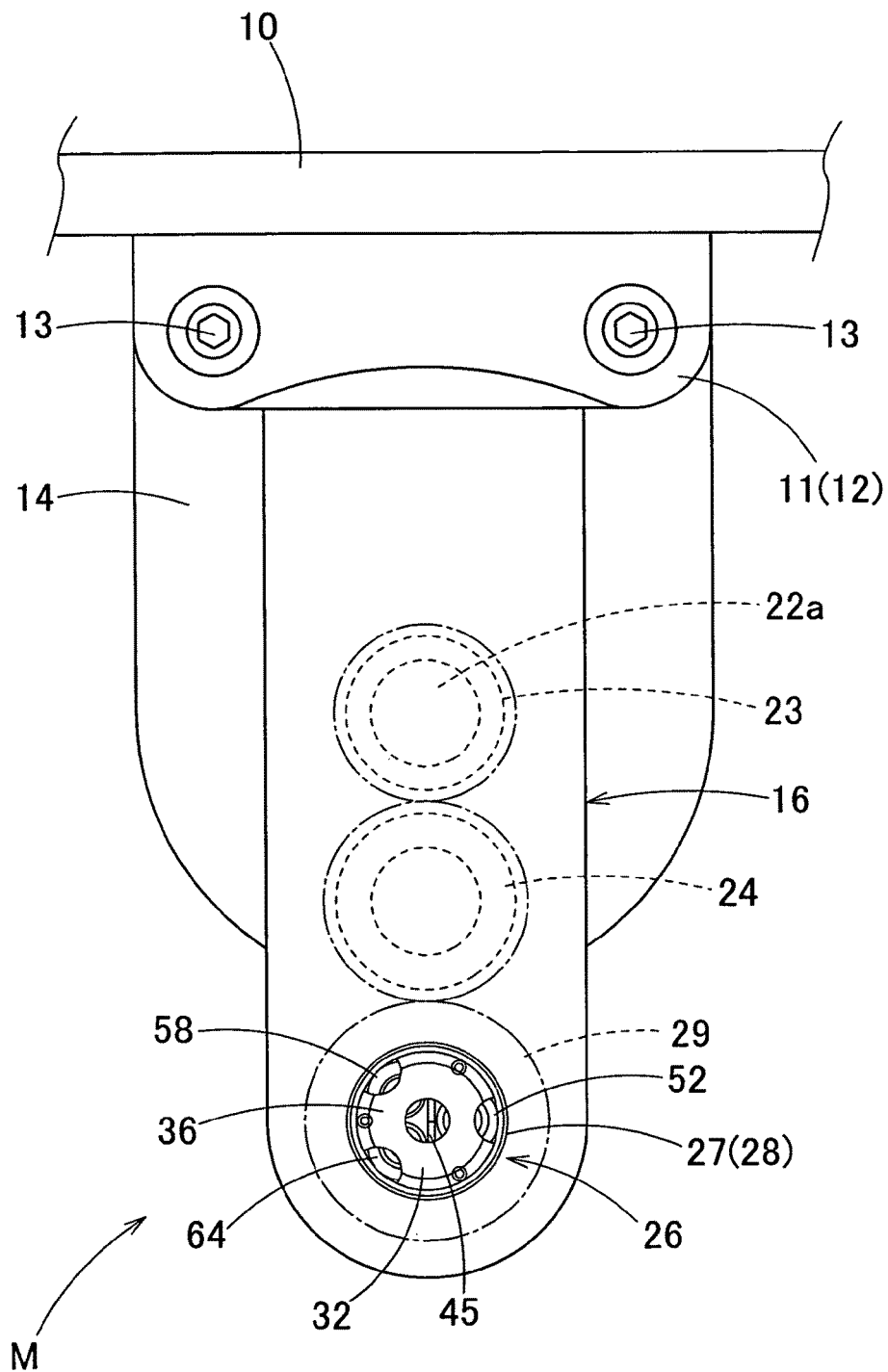
FIG. 2 is a schematic plan view of the tip shaping apparatus.

The tip shaping apparatus M is located within the operation area of the servo gun 1 by operation of the welding robot, and includes a support frame 10, a guide block 14, a gear housing 16, a driving motor 22 and a shape body 26, as shown in FIGS. 1 to 3.

The support frame 10 located within the operation area of the servo gun 1 is provided with brackets 11 and 12 at an upper area and a lower area. Guide rods 13 are located vertically between the upper and lower brackets 11 and 12, on the left and right. The guide block 14 is located horizontally generally at the middle positions of the guide rods 13 in a vertical direction. The guide block 14 is slidable along the axial directions of the guide rods 13, i.e., vertically. Each of the guide rods 13 is sheathed with compression coil springs 15, and the four compression coil springs 15 in total abut against top and bottom planes of the root region of the guide block 14. Expansion and contraction of the springs 15 allow the guide block 14 to move along the axial movement of the electrode tips 5A and 5B.

The guide block 14 is provided at the leading end region with a gear housing 16 comprised of an upper plate 18 and lower plate 19. With the bearings 20 interposed, a rotational base 27 of the shape body 26 is located between the upper plate 18 and lower plate 19. A cover 17 covers the top plane and sides of the upper plate 18.

On the underside of the root section of the gear housing 16 is a driving motor 22 for driving the rotational base 27. The driving motor 22 includes a gear 23 located on the drive shaft 22a for engagement with a gear 24, which engages with a gear 29 of the driving base 27.

As shown in FIGS. 2 to 6, the shape body 26 includes the rotational base 27 which has a holder 28 and the gear 29, a plurality of (three, in this embodiment) shaping (forming) rollers 52, 58 and 64, and a cutter 45. The holder 28 includes a main body 32 which is tubular in shape, an upper cover 36 and a lower cover 37. The main body 32 holds the cutter 45, the shaping rollers 52, 58 and 64.

Figure 5:
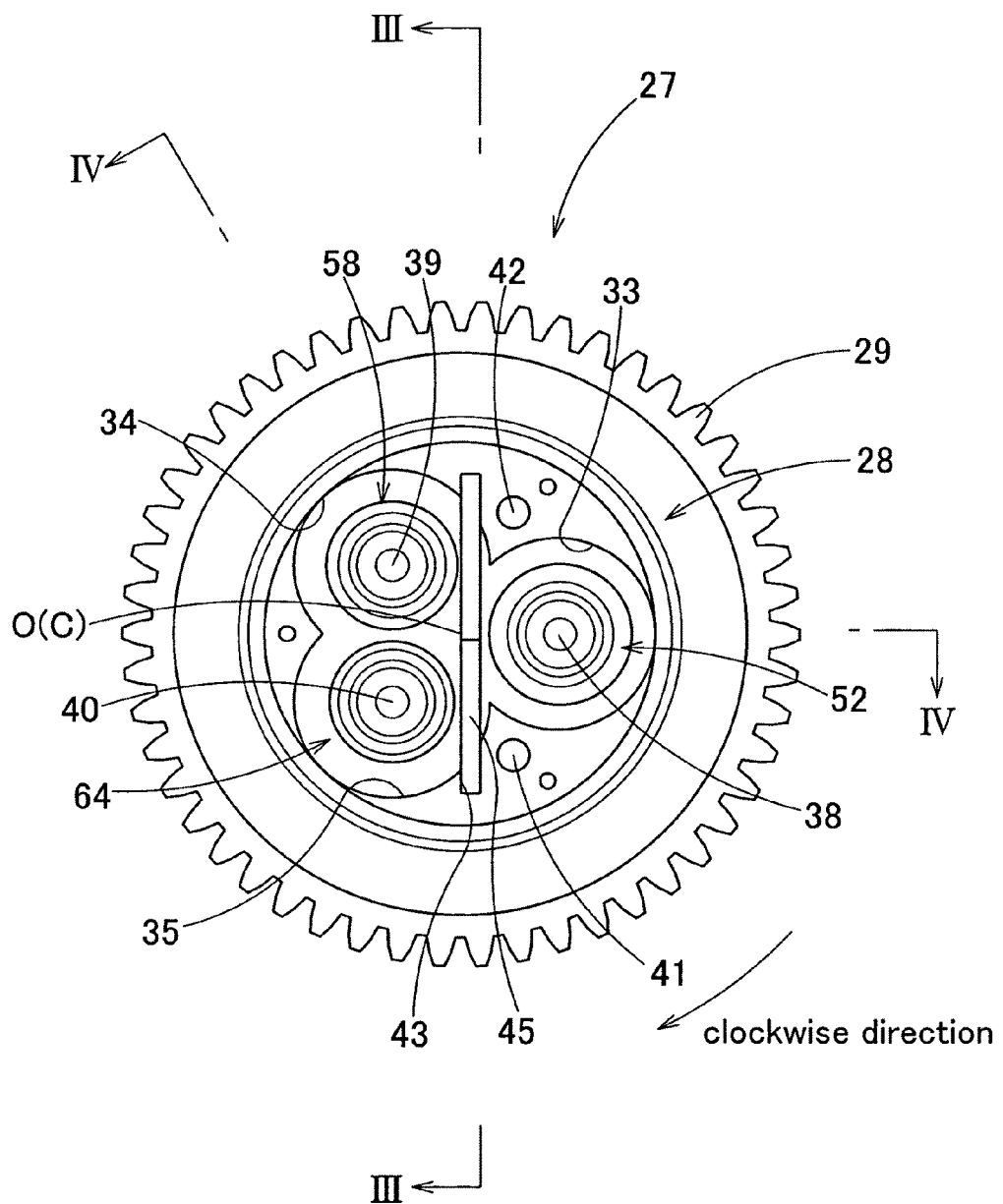
FIG. 5 is a schematic plan view of a shape body of the tip shaping apparatus with an upper cover removed.
Figure 6:
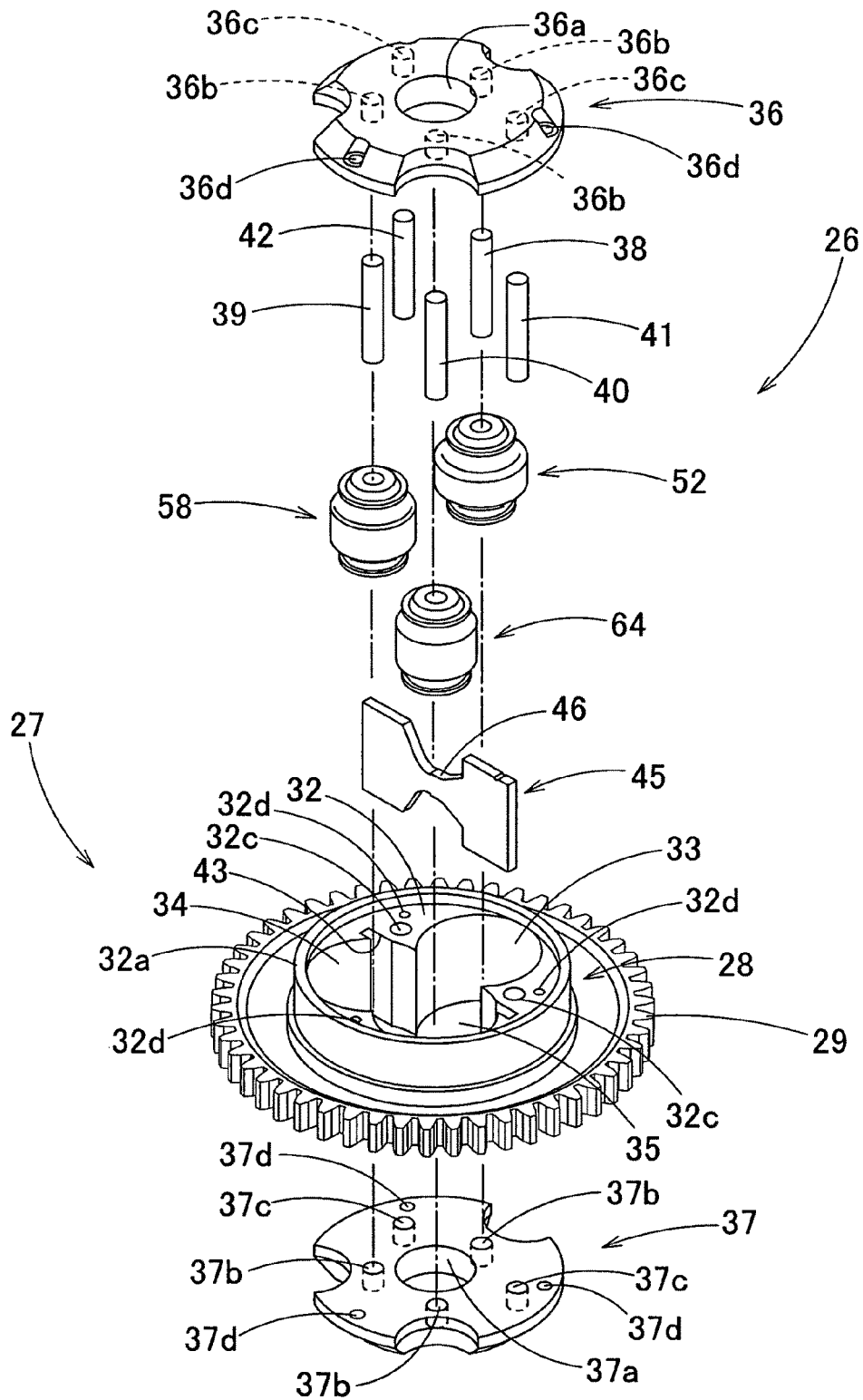
FIG. 6 is an exploded view of a holder, a cutter and shaping rollers of the tip shaping apparatus.

As described above, the rotational base 27 includes the holder 28 and the gear 29 located on the outer circumference of the main body 32 of the holder 28. The rotational base 27 is rotatable with a driving force transmitted via the gears 23, 24 and 29 from the driving motor 22, and is so configured that its rotational central axis O is coaxial with axial centers C of the electrode tips 5A and 5B to be shaped. The holder 28 is so located that its axial direction extends along a vertical direction, and its axial center is congruent with the rotational central axis O. With the bearings 20 located on the outer circumference of the main body 32, the rotational base 27 is rotatably supported at the gear housing 16. The rotational base 27 is configured to rotate about the axial center C of the electrode tips 5A and 5B to be shaped, and as shown in FIG. 5, the rotational base 27 of this embodiment is configured to rotate clockwise along a horizontal direction. Of course, being coaxial with the rotational base 27, the holder 28 rotates clockwise.

The main body 32 of the holder 28 is generally discoid in shape and includes on the inner side three accommodation holes 33, 34 and 35 for accommodating the shaping rollers 52, 58 and 64. The main body 32 is integral with the gear 29 and includes ring sections 32a and 32b which project upward and downward and to which the upper cover 36 and lower cover 37 are secured by screw fastening.

The main body 32 includes two fitting holes 32c running through in a vertical direction for receiving two locating pins 41 and 42.

The main body 32 further includes screw holes 32d for screw fastening of the upper cover 36 and lower cover 37 and a slot 43 running vertically through part of the accommodation holes 33, 34 and 35 for receiving the cutter 45.

Figure 7:
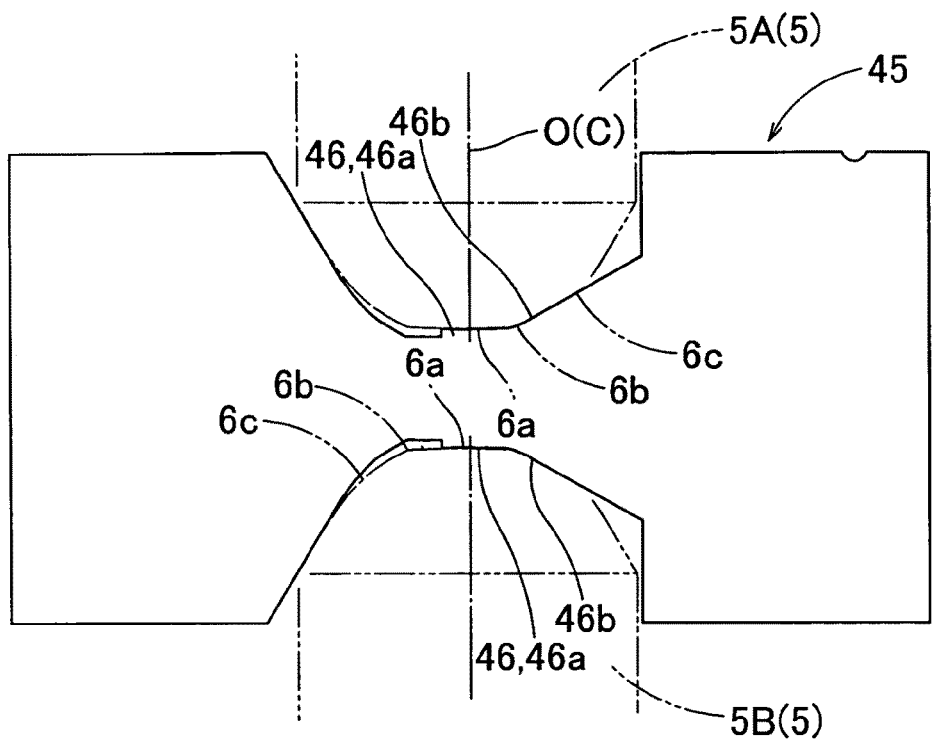
FIG. 7 is a front elevation of the cutter for use in the tip shaping apparatus.
Figure 8:
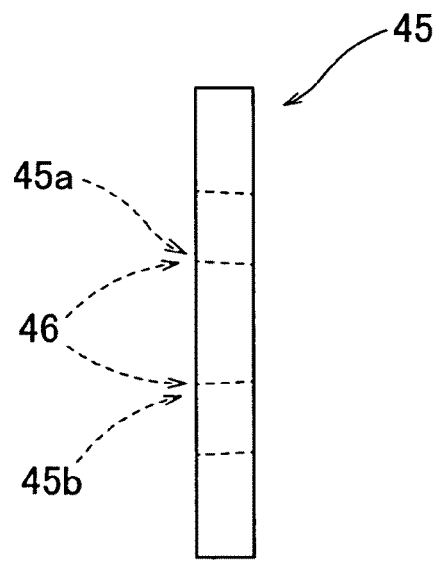
FIG. 8 is a side view of the cutter.
Figure 9:
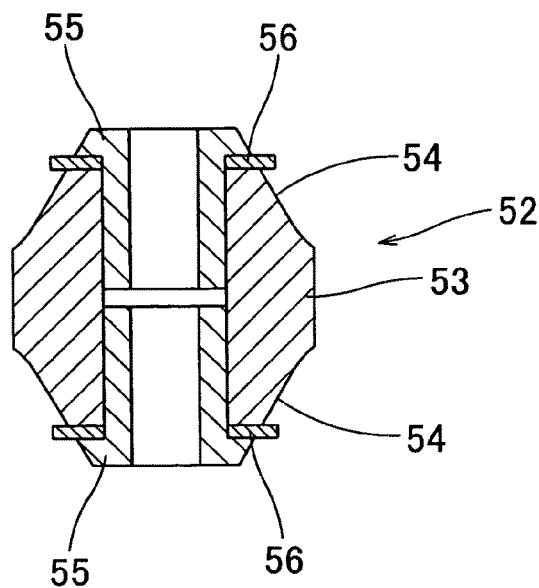
FIG. 9 is a sectional view of a shaping roller (large roller or main shaping roller) comprised of a roller body and separate deburring sections.
Figure 10:
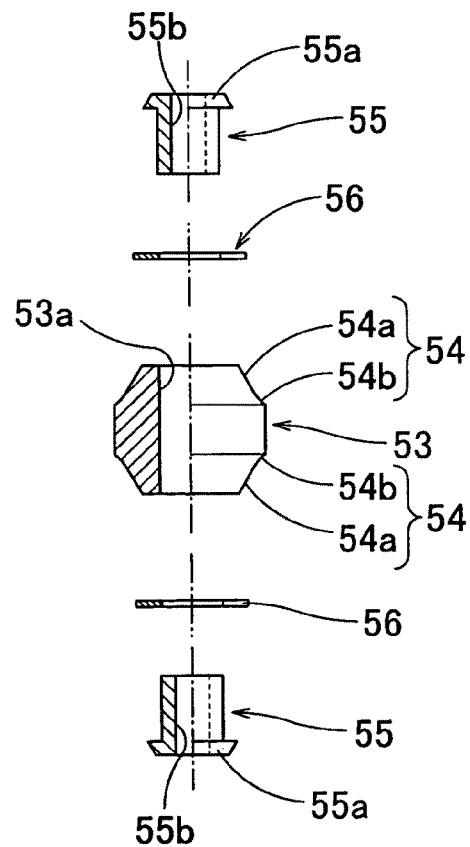
FIG. 10 is an exploded view of the same.
Figure 11:
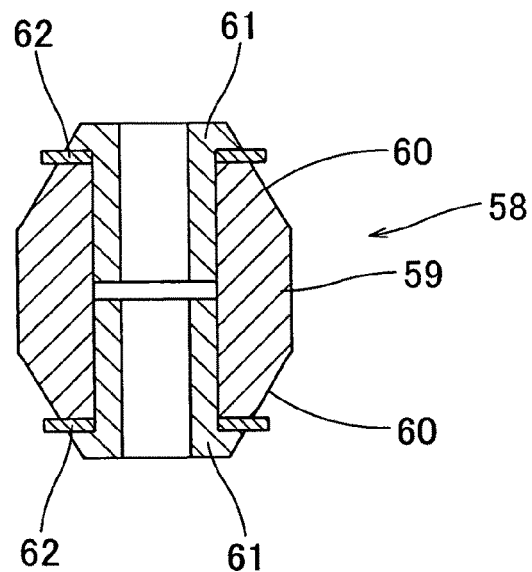
FIG. 11 is a sectional view of another shaping roller (small roller or support roller) comprised of a roller body and separate deburring sections.

Moreover, the accommodation holes 33, 34 and 35 are so formed as to expose cutting blades 46 of the cutter 45 as shown in FIGS. 7 and 8, and serve, (especially the accommodation hole 35), as an exhaust hole for evacuating swarf generated during cutting of the electrode tips 5A and 5B by the cutter 45 as well.

As shown in FIGS. 2 to 4 and 6, the upper cover 36 is formed into an annular shape chamfered at the outer peripheral edge on the top plane, and includes at the center a circular insert hole 36a. On a circumference of the insert hole 36a, three pivot holes 36b are formed vertically at radial three positions about the central axis of the insert hole 36a, with the same radius. Each of the pivot holes 36b holds the holding shaft 38/39/40 of the shaping roller 52/58/64. Two fitting holes 36c are formed around the insert hole 36a vertically for supporting the locating pins 41 and 42. The upper cover 36 also includes screw holes 36d for screw fastening onto the top plane of the main body 32 and a lightening recess at an appropriate location.

As shown in FIGS. 2 to 4 and 6, the lower cover 37 is formed into an annular shape chamfered at the outer peripheral edge on the bottom plane, and includes at the center a circular insert hole 37a. On a circumference of the insert hole 37a, three pivot holes 37b are formed vertically at radial three positions about the central axis of the insert hole 37a, with the same radius. Each of the pivot holes 37b holds the holding shaft 38/39/40 of the shaping roller 52/58/64. Two fitting holes 37c are formed around the insert hole 37a vertically for supporting the locating pins 41 and 42. The lower cover 37 also includes screw holes 37d for screw fastening to the bottom plane of the main body 32 and a lightening recess at an appropriate location.

The pivot holes 36b of the upper cover 36 and the pivot holes 37b of the lower cover 37 are located on congruous positions relative to the axial centers C of the electrode tips 5A and 5B to be shaped such that opposite ends of the three holding shafts 38, 39 and 40 are fitted therein. Further, the fitting holes 36c of the upper cover 36 and fitting holes 37c of the lower cover 37 are located on congruous positions relative to the axial centers C of the electrode tips 5A and 5B to be shaped such that opposite ends of the locating pins 41 and 42 are fitted therein.

The holding shaft 38 holds the shaping roller 52 in such a manner as to allow the roller 52 to rotate there about, and constitutes a rotation axis RA of the shaping roller 52. The holding shaft 39 holds the shaping roller 58 in such a manner as to allow the roller 58 to rotate there about, and constitutes a rotation axis RA of the shaping roller 58, whereas the holding shaft 40 holds the shaping roller 64 in such a manner as to allow the roller 64 to rotate there about, and constitutes a rotation axis RA of the shaping roller 64.

As shown in FIGS. 3 and 6 to 8, the cutter 45 is generally formed into a plate which is so arranged that the thickness direction extends along a direction perpendicular to the rotational central axis O of the holder 28 and is gradually reduced in vertical dimension toward the rotational central axis O. In order to cut the leading end surfaces 6a and vicinities of edges 6b of the enlarging surfaces 6c proximate the leading end surfaces 6a of the electrode tips 5A and 5B, the cutter 45 includes two cutting blades 46 on both sides of edges 45a and 45b of the cutter 45 in a direction extending along the rotational central axis O (i.e., in a vertical direction, in the illustrated embodiment). Each of the cutting blades 46 extends to one side in a direction perpendicular to the axis from the vicinity of the axial center C in a projected state in a direction perpendicular to the axes of the electrode tips 5A and 5B, i.e. extends through the rotational central axis O of the holder 28 in a direction perpendicular to the axis C.

The area of each of the cutting blades 46 that actually cuts the electrode tip 5 is comprised of an end surface 46a that cuts the leading end surface 6a and an edge region 46b that cuts the vicinity of the edge 6b of the enlarging surface 6c, and the cutting blade 46 is not so formed as to cut an entire area of the enlarging surface 6c so as to reduce the cutting amount. The cutting blades 46 are formed on one side in a thickness direction of the cutter 45 on both edges 45a and 45b, and each of the end surfaces 46a for cutting the leading end surfaces 6a is comprised of the area from the edge 46b to the rotational central axis O because the area that crosses over the rotational central axis O contacts the electrode tip 5A/5B in a counter-rotating state, and therefore, cannot cut the electrode tip 5A/5B.

As shown in FIGS. 4 to 6, 9 and 10, the shaping roller 52 is rotatably held by the holding shaft 38 and located inside the accommodation hole (exhaust hole) 33. The holding shaft 38 is supported at opposite ends by the pivot holes 36b and 37b of the upper cover 36 and lower cover 37, and so arranged as to extend along the rotational central axis O.

Out of the three shaping rollers, the shaping roller 52 serves as a large roller or main shaping roller that shapes the enlarging surfaces 6c of the electrode tips 5A and 5B. The shaping roller 52 includes a roller body 53, flanged bushes 55 that support upper and lower regions of the holding shaft 38 inserted through the roller body 53 and deburring rings 56 as deburring sections that are annular in shape and abut against the back faces of the flanges 55a of the flanged bushes 55 at ends of shaping surfaces 54.

The roller body 53 is formed into a barrel-like shape provided at opposite sides in a direction extending along the rotational central axis O with shaping (forming) surfaces 54 that are pressed against the electrode tips 5A and 5B for shaping the enlarging surfaces 6c. A through hole 53a is formed through the roller body 53 along the rotational central axis O to receive the flanged bushes 55. Each of the shaping surfaces 54 includes a shaping region 54a for shaping the enlarging surface 6c of the electrode tip 5A/5B and an extended region 54b entering the rotational area of the cutting blade 46 of the cutter 45.

Each of the flanged bushes 55 is comprised of an oilless bush having at an end a flange 55a and an insert hole 55b for receiving the holding shaft 38. The flanged bushes 55 are inserted into the through hole 53a. Each of the deburring rings 56 is clamped between the flange 55a of the flanged bush 55 and the roller body 53, and the deburring rings 56 project from both end faces of the roller body 53 like a flange toward a direction perpendicular to the axis of the roller body 53 at areas extended from the shaping surfaces 54.

Figure 15:
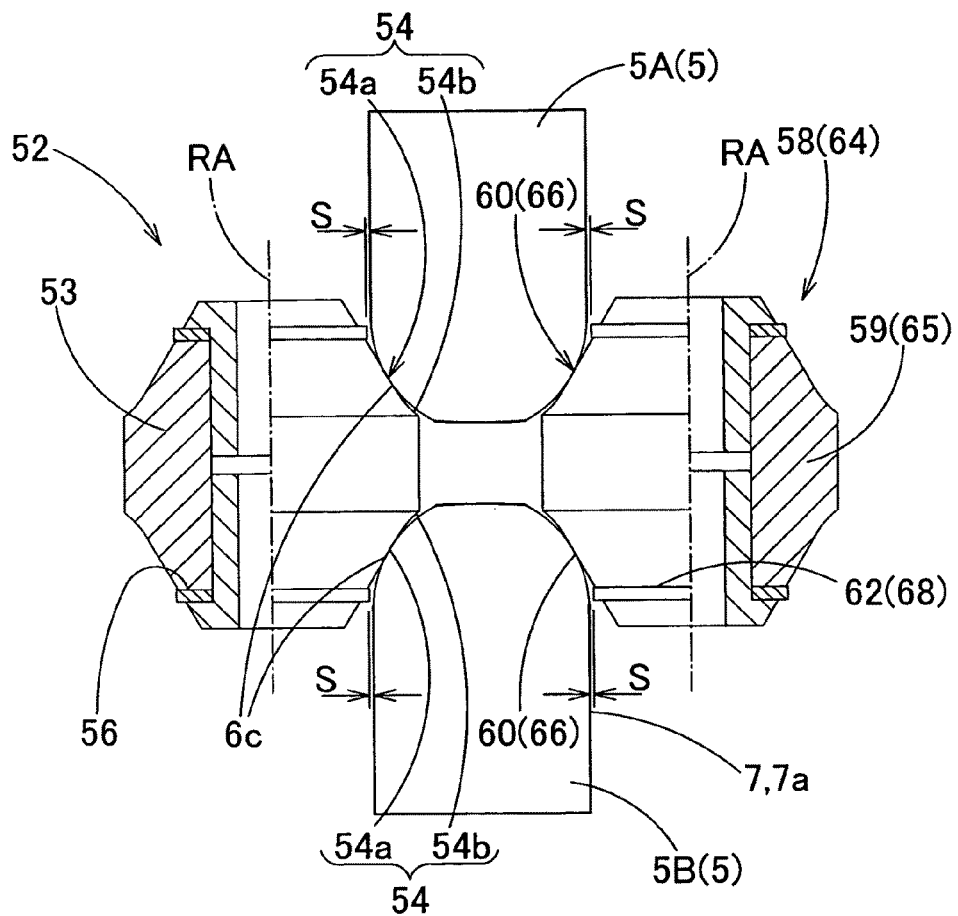
FIG. 15 is a schematic partial section of the tip shaping apparatus showing a pair of electrode tips set on shaping surfaces of the shaping roller.
Figure 17:
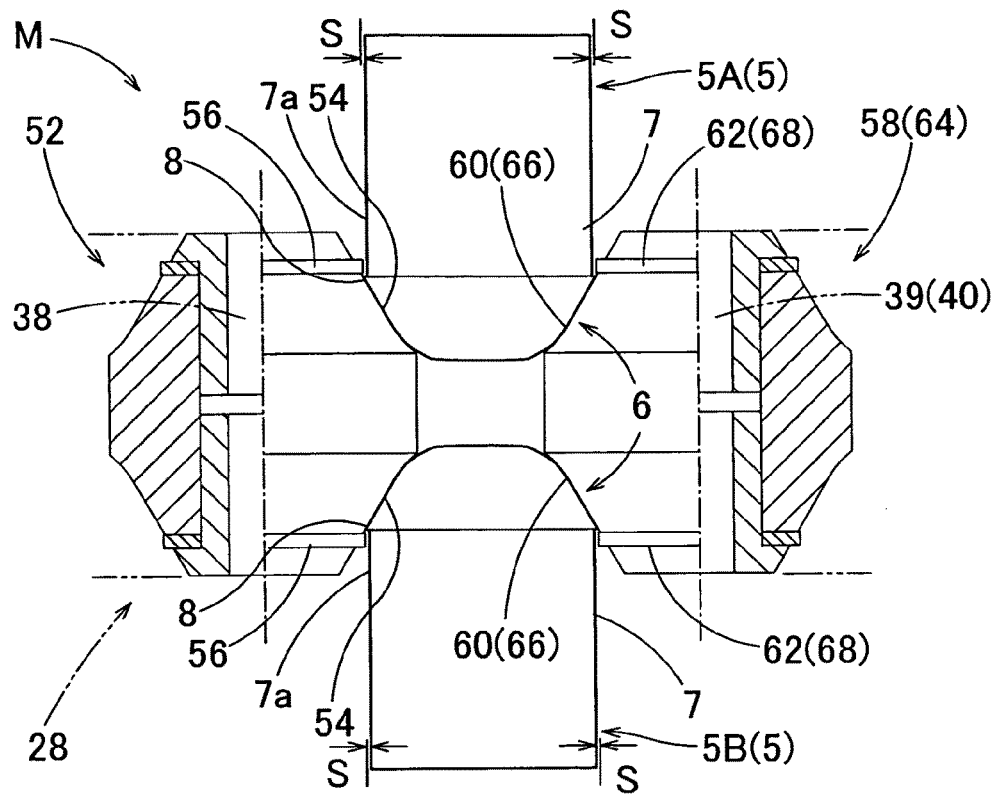
FIG. 17 is a schematic partial section showing electrode tips right before being ejected from the shaping surfaces of the shaping roller.
Figure 18:
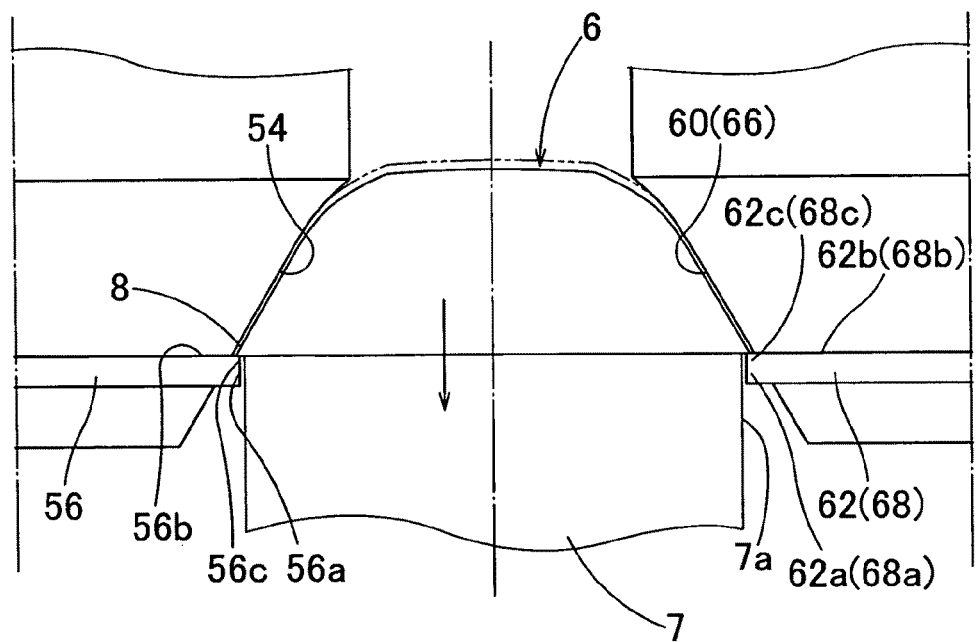
FIG. 18 is an enlarged view showing a burr contacting the deburring section.

As shown in FIG. 15, the deburring rings 56 as mounted on the roller body 53 are located on such positions as not to engage with (or contact) the electrode tips 5A and 5B when the tips 5A and 5B are placed on the tip shaping apparatus M. As shown in FIGS. 17 and 18, the deburring rings 56 are located on such positions as to be capable of removing burrs 8 when the electrode tips 5A and 5B are pulled out of the tip shaping apparatus M. That is, the deburring rings 56 are located on such positions as to confront burrs 8 when the electrode tips 5A and 5B are pulled out of the holder 28 of the tip shaping apparatus M. More specifically, the deburring rings 56 are located proximate the outer circumferential planes 7a of the root sections 7 of the electrode tips 5A and 5B during shaping so as to contact and remove burrs 8 when the tips 5A and 5B are pulled out of the holder 28.

As shown in FIGS. 4 to 6, 11 and 12, the shaping roller 58 is rotatably held by the holding shaft 39 and located inside the accommodation hole (exhaust hole) 34. The holding shaft 39 is supported at opposite ends by the pivot holes 36b and 37b of the upper cover 36 and lower cover 37, and so arranged as to extend along the rotational central axis O.

Out of the three shaping rollers, the shaping roller 58 serves as a small roller or support roller that supports the electrode tips 5A and 5B as well as shapes the enlarging surfaces 6c of the tips 5A and 5B. The shaping roller 58 includes a roller body 59, flanged bushes 61 that support upper and lower regions of the holding shaft 39 inserted through the roller body 59 and deburring rings 62 as deburring sections that abut against the back faces of the flanges 61a of the flanged bushes 61 at ends of shaping surfaces 60.

The roller body 59 is formed into a barrel-like shape provided at opposite sides in a direction extending along the rotational central axis O with shaping (forming) surfaces 60 that are pressed against the electrode tips 5A and 5B for shaping the enlarging surfaces 6c. A through hole 59a is formed through the roller body 59 along the rotational central axis O to receive the holding shaft 39. Each of the shaping surfaces 60 includes a shaping region 60a for shaping the enlarging surface 6c of the electrode tip 5 and an extended region 60b entering the rotational area of the cutting blade 46 of the cutter 45. The extended regions 60b are small areas located to opposite ends in an axial direction of the roller body 59 relative to the extended regions 54b of the roller body 53.

Each of the flanged bushes 61 is comprised of an oilless bush having at an end a flange 61a and an insert hole 61b for receiving the holding shaft 39. The flanged bushes 61 are inserted into the through hole 59a. Each of the deburring rings 62 is clamped between the flange 61a of the flanged bush 61 and the roller body 59, and the deburring rings 62 project from both end faces of the roller body 59 toward a direction perpendicular to the axis of the roller body 59 at areas extended from the shaping surfaces 60.

As shown in FIG. 15, the deburring rings 62 as mounted on the roller body 59 are located on such positions as not to engage with the electrode tips 5A and 5B when the tips 5A and 5B are inserted into the holder 28 of the tip shaping apparatus M. As shown in FIG. 17, like the deburring rings 56, the deburring rings 62 are located on such positions as to confront burrs 8 when the electrode tips 5A and 5B are pulled out of the holder 28 of the tip shaping apparatus M. Further, the deburring rings 62 are located proximate the outer circumferential planes 7a of the root sections 7 of the electrode tips 5A and 5B undergoing shaping so as to contact and remove burrs 8 when the tips 5A and 5B are pulled out of the holder 28.

As shown in FIGS. 4 to 6, 13 and 14, the shaping roller 64 is rotatably held by the holding shaft 40 and located inside the accommodation hole (exhaust hole) 35. The holding shaft 40 is supported at opposite ends by the pivot holes 36b and 37b of the upper cover 36 and lower cover 37, and so arranged as to extend along the rotational central axis O.

Out of the three shaping rollers, the shaping roller 64 serves as a minimal roller or support roller that mainly supports the electrode tips 5A and 5B as well as shapes the enlarging surfaces 6c of the tips 5A and 5B while the shaping rollers 52 and 58 do so. The shaping roller 64 includes a roller body 65, flanged bushes 67 that support upper and lower regions of the holding shaft 40 inserted through the roller body 65 and deburring rings 68 as deburring sections that abut against the back faces of the flanges 67a of the flanged bushes 67 at ends of shaping surfaces 66.

The roller body 65 is formed into a barrel-like shape provided at opposite sides in a direction extending along the rotational central axis O with shaping (forming) surfaces 66 that are pressed against the electrode tips 5A and 5B for shaping the enlarging surfaces 6c and support the enlarging surfaces 6c. A through hole 65a is formed through the roller body 65 along the rotational central axis O to receive the holding shaft 40. The shaping surfaces 66 of the roller body 65 do not include an area like the extended region 54b/60b in the roller body 53/59.

Each of the flanged bushes 67 is comprised of an oilless bush having at an end a flange 67a and an insert hole 67b for receiving the holding shaft 40. The flanged bushes 67 are inserted into the through hole 65a. Each of the deburring rings 68 is clamped between the flange 67a of the flanged bush 67 and the roller body 65, and the deburring rings 68 project from both end faces of the roller body 65 toward a direction perpendicular to the axis of the roller body 65 at areas extended from the shaping surfaces 66.

As shown in FIG. 15, the deburring rings 68 as mounted on the roller body 65 are located on such positions as not to engage with the electrode tips 5A and 5B when the tips 5A and 5B are inserted into the holder 28 of the tip shaping apparatus M. As shown in FIGS. 17 and 18, outer circumferential surfaces 68a of the deburring rings 68 are located proximate burrs 8 such that the deburring rings 68 cut out the burrs 8 when the burrs 8 are pulled out of the tip shaping apparatus M. That is, like the deburring rings 56 and 62, the deburring rings 62 are located on such positions as to confront burrs 8 when the electrode tips 5A and 5B are pulled out of the holder 28 of the tip shaping apparatus M. Further, the deburring rings 68 are located proximate the outer circumferential planes 7a of the root sections 7 of the electrode tips 5A and 5B so as to contact and remove burrs 8 when the tips 5A and 5B are pulled out of the holder 28.

Figure 12:
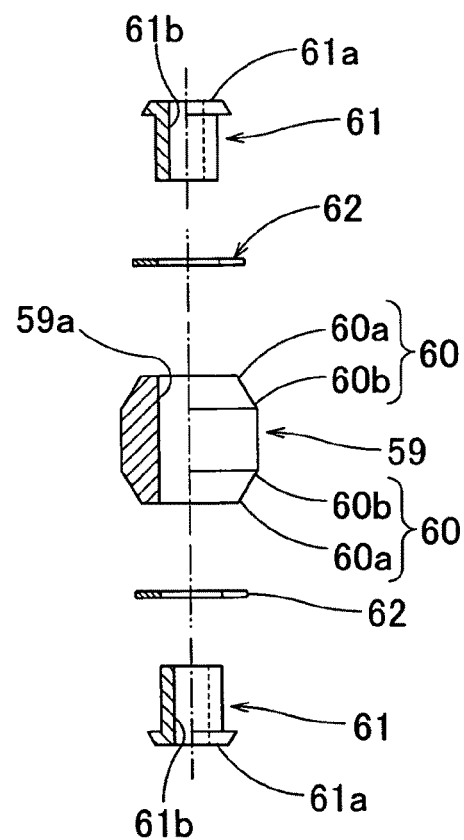
FIG. 12 is an exploded view of the same.
Figure 13:
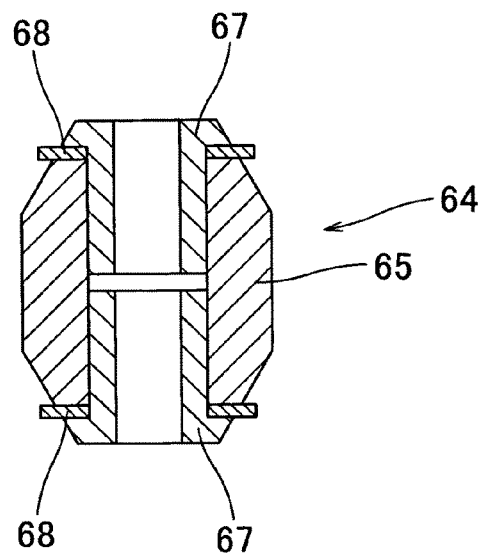
FIG. 13 is a sectional view of yet another shaping roller (minimal roller or support roller) comprised of a roller body and separate deburring sections.
Figure 14:
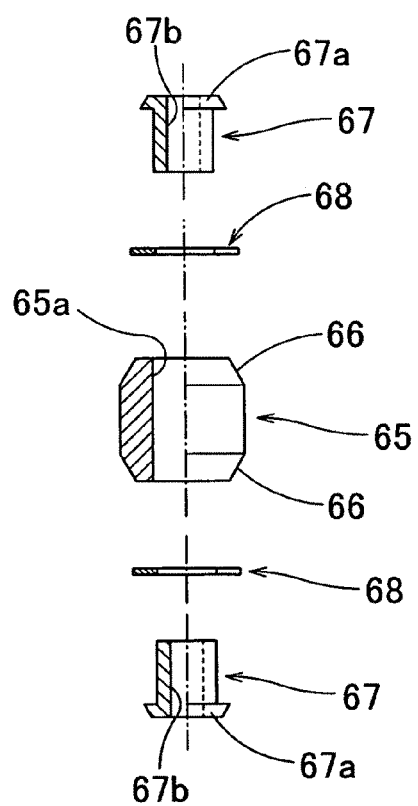
FIG. 14 is an exploded view of the same.

In FIGS. 15 and 17, the actual outer diameter of the roller body 65 of the shaping roller 64 is smaller than that of the roller body 59 of the shaping roller 58 since the roller body 65 is not provided with extended regions on the shaping surfaces 66 (refer to FIGS. 12 and 14).

However, the deburring rings 56, 62 and 68 of the shaping rollers 52, 58 and 64 are formed into identical contours with the same outer diameters and thicknesses, and the distances between the rotational central axis O and each of holding shafts 38, 39 and 40 holding the shaping rollers 52, 58 and 64 are equal. Accordingly, when set in the holder 28, the distances between the rotational central axis O and each of the deburring rings 56, 62 and 68 are equal, and the locations of the deburring rings 56, 62 and 68 relative to the rotational central axis O are the same.

In this embodiment, as shown in FIG. 15, a void space S is formed between the outer circumferential planes 56*a*, 62*a* and 68*a* of the deburring rings 56, 62 and 68 and the outer circumferential plane 7*a* of the root section 7 of each of the electrode tip 5A/5B. It is required to predetermine the void space S in such an extent that created burrs 8 may not cause a branched electric current passing through the burrs 8 when the electrode tips 5A and 5B are used for welding. In this embodiment, the diameter D of the root section 7 of each of the electrode tips 5 (5A, 5B) is 16 mm (FIG. 3), and the void space S is set at 0.5 mm and below so as to form an allowance of 1 mm in total all around the outer circumferential plane 7*a* of the electrode tip 5. Of course, as shown in FIGS. 19A, 19B, 20A and 20B, the numeric value of the void space S should be adequately determined according to how much a burr 8 should be reduced in height, to the height h1 from the height h0 as originally created, and therefore, should not be limited to the numeric value of this specific embodiment. By way of example, in order to make the height h1 of a burr 8 after treatment small, the void space S is set to be as small as possible, i.e., the outer diameters of the deburring rings 56, 62 and 68 as deburring sections are set to be as large as possible in such an extent as to permit insertion and ejection of the electrode tips 5. On the contrary, if the height h1 after the treatment may be larger, the void space S may be larger, i.e., the outer diameters of the deburring rings 56, 62 and 68 may be smaller.

As described above, a too large void space S would hinder steady removal of burrs 8 that would cause welding failure whereas a too small void space S would not permit insertion of the electrode tips 5A and 5B. Accordingly, the void space S would desirably be set within a range of 0.1 to 1.0 mm, and more preferably within a range of 0.1 to 0.5 mm.

The manner the tip shaping apparatus M in this embodiment is used is now described. After conducting predetermined number of times of spot welding, the welding robot locates the servo gun 1 close to the tip shaping apparatus M and places the electrode tips 5A and 5B above the insert hole 36*a* and the insert hole 37*a* of the holder 28 in an opposite manner, along a vertical direction (i.e., along the rotational central axis O) (FIG. 3). In response to this, the tip shaping apparatus M rotates the driving motor 22.

Then the servo gun 1 is actuated and inserts the electrode tips 5A and 5B into the holder 28 so the tips 5A and 5B come close to each other, as shown in FIG. 15, and presses the tips 5A and 5B against the shaping surfaces 54, 60 and 66 of the shaping rollers 52, 58 and 64. Then the shaping rollers 52, 58 and 64 rotate clockwise (FIG. 5) in a circumferential direction of the electrode tips 5A and 5B together with the holder 28 as the enlarging surfaces 6*c* of the tips 5A and 5B are pressed against the shaping surfaces 54, 60 and 66, and thus shape the enlarging surfaces 6*c* after the shapes of the shaping surfaces 54, 60 and 66. In the meantime, the cutter 45 cuts and shapes the leading end surfaces 6*a* and areas of the enlarging surfaces 6*c* proximate the edges 6*b* of the leading end surfaces 6*a* of the tips 5A and 5B by the end surfaces 46*a* and edge regions 46*b* of the cutting blades 46.

At this time, the shaping roller 52 conducts shaping mainly whereas the shaping rollers 58 and 64 support the electrode tips 5A and 5B in a direction perpendicular to the axis as well as conduct shaping supplementarily.

Figure 16:
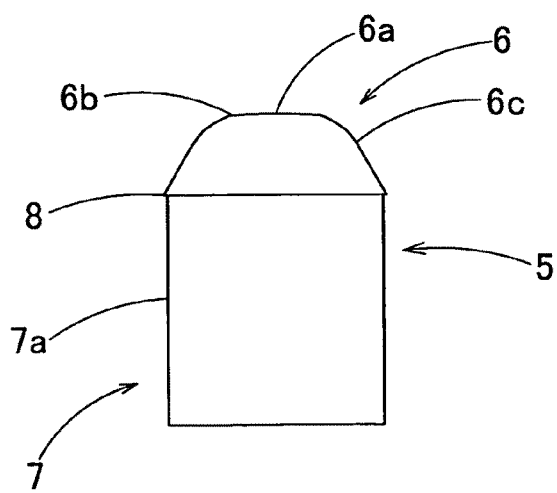
FIG. 16 is a front elevation of an electrode tip to which a burr is attached.

The enlarging surface 6*c* of each of the electrode tips 5A and 5B is pressed by the shaping surfaces 54, 60 and 66 of the shaping rollers 52, 58 and 64 and plastically deformed to correspond to the shapes of the shaping surfaces 54, 60 and 66. At this time, a superfluous material of the electrode tip 5A/5B generated due to rolling is shoved toward the leading end face 6*a* and toward the root section 7 of the electrode tip 5A/5B. The superfluous material entered into the side of the leading end face 6*a* is cut off by the cutter 45 whereas the superfluous material entered into the side of the root section 7 forms a burr (a raised edge) 8, as shown in FIG. 16, on an extension of the enlarging surface 6*c* on the side of the root section 7.

That is, a burr 8 is formed on the edge of the enlarging surface 6*c* of each of the electrode tips 5A and 5B on the side of the root section 7 in such a manner as to project outwardly, in a direction perpendicular to the axis, from the outer circumferential plane 7*a* of the root section 7. As shown in FIGS. 17 and 18, this burr 8 extends up to vicinities of end faces (on the side of the center in the axial direction of the shaping rollers 52, 58 and 64) 56*b*, 62*b* and 68*b* of the deburring rings 56, 62 and 68.

As described above, there is a void space S between the deburring rings 56, 62 and 68 and the outer circumferential plane 7*a* of the root section 7 of the electrode tip 5A/5B. That is, the outer diameter of a hypothetical circle contactable with the end faces 56*b*, 62*b* and 68*b* of the three deburring rings 56, 62 and 68 is greater than the outer diameter of the electrode tip 5A/5B, which is 16 mm in this embodiment, by a double of the void space S (2S), i.e., 16 mm+2S and below. If the outer diameter of the electrode tip 5A/5B including the protruding height h0 of a burr 8 surpasses 16 mm+2S, the burr 8 engages with the deburring rings 56, 62 and 68 when the tip 5A/5B is ejected from the shaping surfaces 54, 60 and 66 of the shaping rollers 52, 58 and 64.

In the embodiment, the shaping rollers 52, 58 and 64 rotate clockwise in FIG. 5 about the rotational central axis O of the rotational base 27. Further, the shaping rollers 52, 58 and 64 are rotatable about the holding shafts 38, 39 and 40 (i.e., about the rotation axes RA) respectively even when the electrode tips 5A and 5B are pressed against the shaping surfaces 54, 60 and 66 of the shaping rollers 52, 58 and 64.

When the shaping of the electrode tips 5A and 5B is completed and the tips 5A and 5B are pulled out of the tip shaping apparatus M, the deburring rings 56, 62 and 68 rotating about the rotational central axis O remove burrs 8 formed on the tips 5A and 5B in such a way as to reduce the protruding height h0 of the tips 5A and 5B to height h1 (as shown in FIGS. 19A, 19B, 20A and 20B) all over the circumferences. The deburring rings 56, 62 and 68 remove the burrs 8 by having the end faces 56*b*, 62*b* and 68*b* to engage with leading end portions 8*a* of the burrs 8 moving toward the ejecting direction.

Figure 19A:
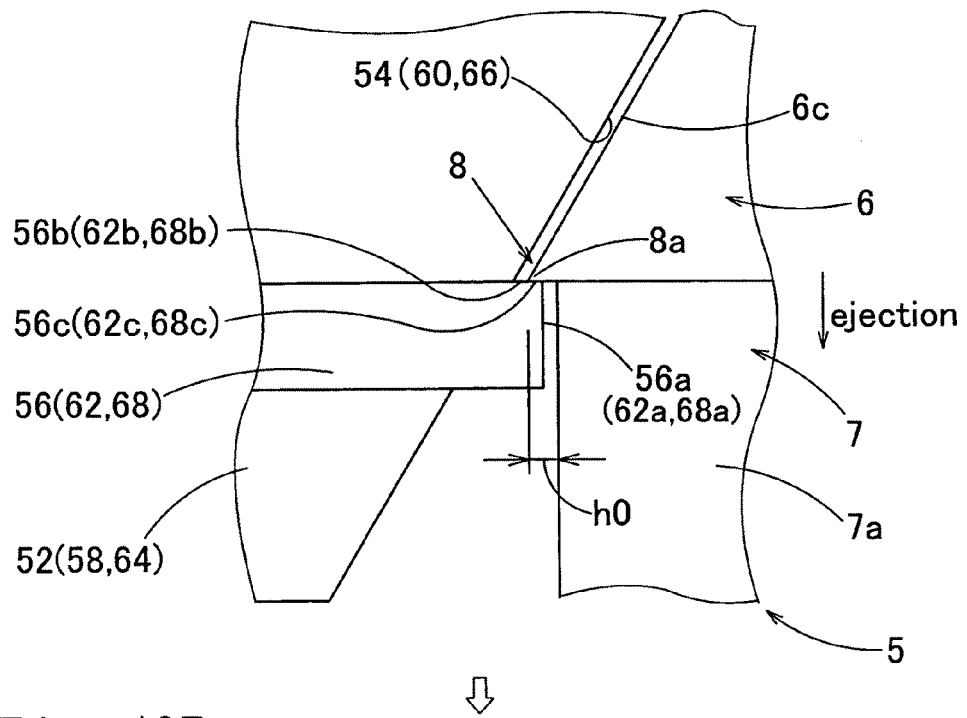
FIG. 19A is an enlarged view showing a burr contacting the deburring section.
Figure 19B:
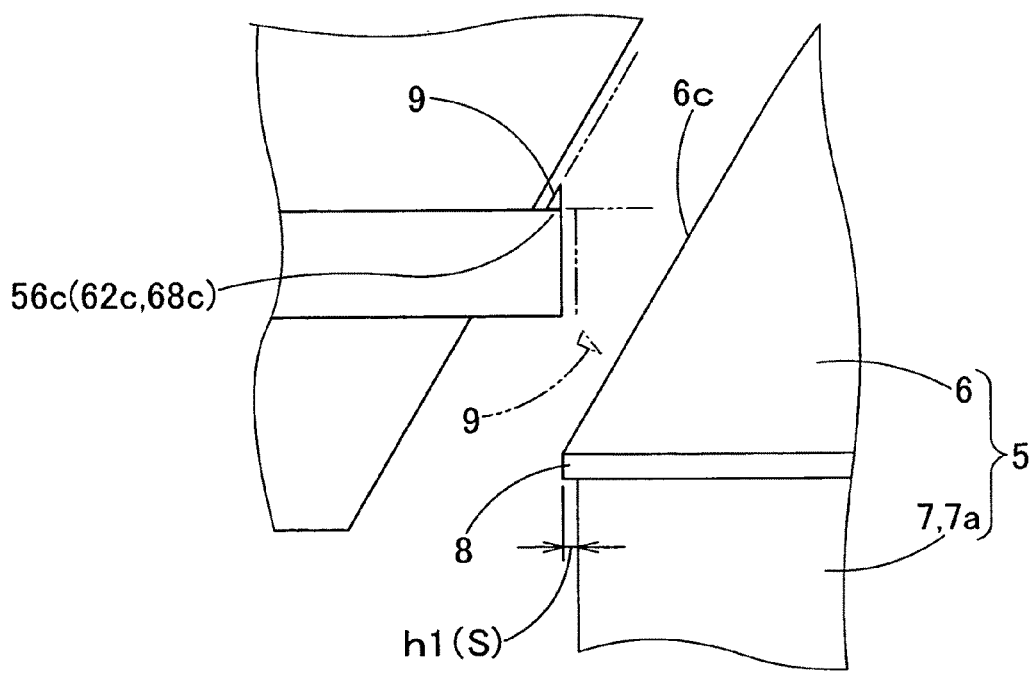
FIG. 19B is an enlarged view showing the burr removed by the deburring section by resection.
Figure 20A:
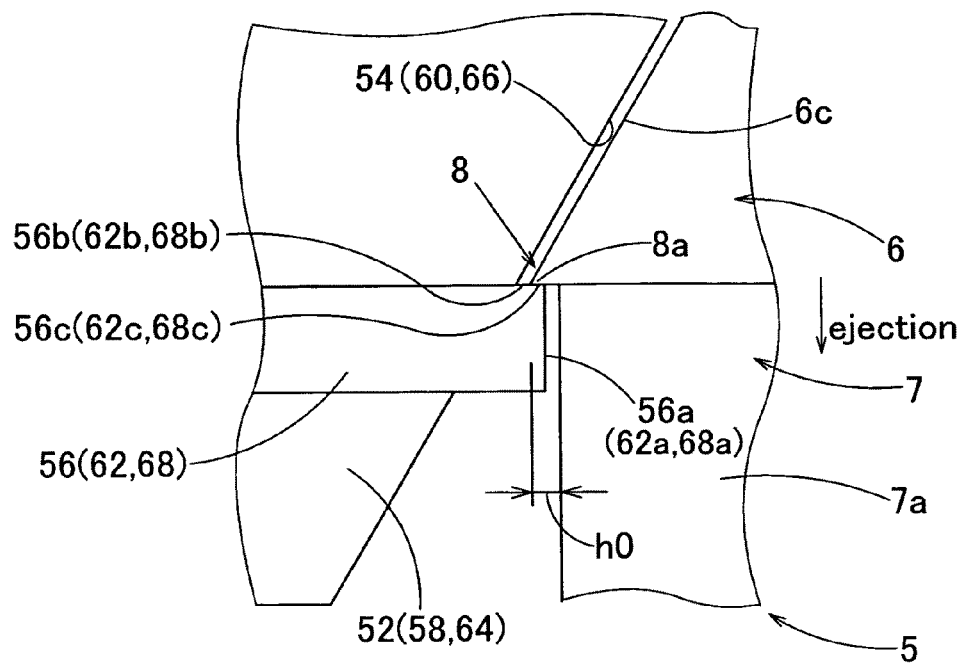
FIG. 20A is an enlarged view showing a burr contacting the deburring section.
Figure 20A:
Figure 20B:
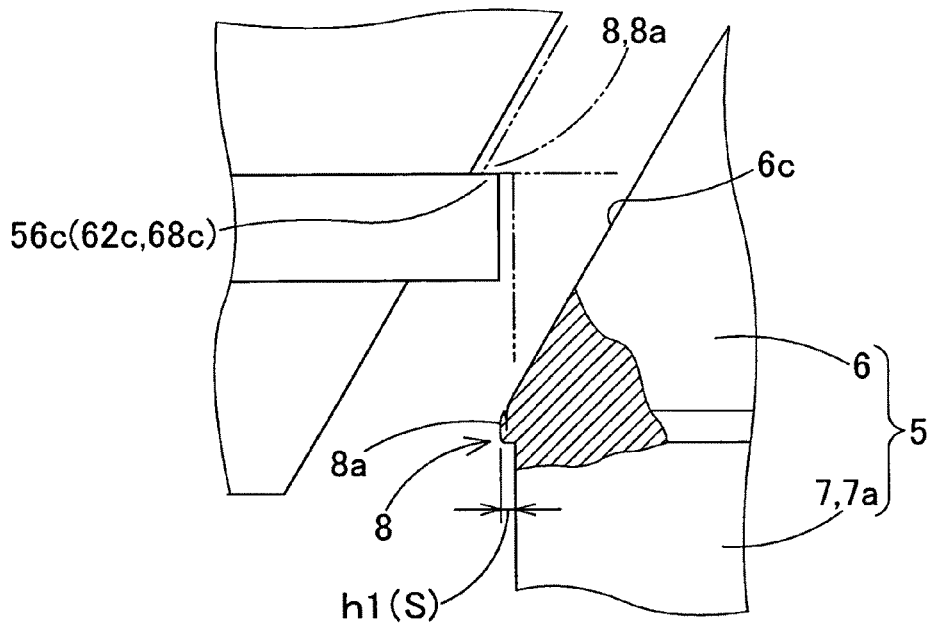
FIG. 20B is an enlarged view showing the burr removed by the deburring section by bending.

Removal of burrs 8 may be conducted by means of resection or bending on condition that the protruding height h0 is reduced to height h1. Specifically, as shown in FIGS. 19A and 19B, a burr 8 may be cut off in such a manner as to create scrapes 9 by angular edges 56*c*, 62*c* and 68*c* of the end faces 56*b*, 62*b* and 68*b* of the deburring rings 56, 62 and 68. Alternatively, as shown in FIGS. 20A and 20B, the burr 8 may be bent toward the enlarging surface 6*c* at the leading end portion 8*a* by the end faces 56*b*, 62*b* and 68*b* of the deburring rings 56, 62 and 68. It will also be appreciated to cut off part of the burr 8 and bend other part. That is, removal of a burr 8 can be conducted arbitrarily as long as the protruding height h0 of the burr 8 is reduced to height h1 by the deburring rings 56, 62 and 68.

In this embodiment, passing of a burr 8 of the electrode tip 5A/5B through the thickness of the deburring rings 56, 62 and 68 makes the maximum diameter of the electrode tip 5A/5B 16 mm+2S and below, i.e., forms the tip 5A/5B into a reusable form. The deburring rings 56, 62 and 68 of this embodiment are configured to rotate several times during one passing movement of a burr 8 through the thickness of the deburring rings 56, 62 and 68. In other words, every part of the leading end portion 8*a* of a burr 8 contacts with the rotating deburring rings 56, 62 and 68 several times during the ejection of the tip 5A/5B from the tip shaping apparatus M.

As described above, when the electrode tips 5A and 5B are deformed after predetermined number of times of use, the tip shaping apparatus M of the embodiment shapes the tip sections 6 of the electrode tips 5A and 5B each having the leading end surface 6*a*, edge 6*b* and enlarging surface 6*c*, by the shaping surfaces 54, 60 and 66 of the shaping rollers 52, 58 and 64 and the cutting blades 46 of the cutter 45, into reusable condition. Moreover, the deburring rings or deburring sections 56, 64 and 68 of the shaping rollers 52, 58 and 64 located on such positions as to confront burrs 8 formed due to plastic deformation by the shaping surfaces 54, 60 and 66 remove the burrs 8 by reducing their protruding height h0 to height h1 at the ejection of the electrode tips 5A and 5B from the tip shaping apparatus M. Therefore, the tip shaping apparatus M eliminates the fear that the burrs 8 contact and damage a workpiece and that an electric current passing through the burrs 8 causes welding failure.

Moreover, the tip shaping apparatus M includes a plurality (three, in this specific embodiment) of the shaping rollers 52, 58 and 64 located around the rotational central axis O of the holder 28 and each of the rollers 52, 58 and 64 is rotatable about the rotation axis RA extending in parallel to the rotational central axis O of the holder 28. Each of the shaping rollers 52, 58 and 64 is formed into a generally barrel-like shape in which the shaping surfaces 54/60/66 are gradually reduced in diameter toward opposite ends in the axial direction. With this configuration, more than one shaping rollers 52, 58 and 64 located around the electrode tips 5A and 5B support the tips 5A and 5B and shape the tips 5A and 5B quickly without wobbling the tips 5A and 5B.

Furthermore, the tip shaping apparatus M includes a cutter 45 held by the holder 28 and including cutting blades 46 that cut vicinities of the leading end surfaces 6*a* of both of the electrode tips 5A and 5B while the holder 28 rotates. In shaping operation of the tip sections 6 of the electrode tips 5A and 5B, the cutting blades 46 cut the leading end surfaces 6*a* and vicinities of the edges 6*b* of the leading end surfaces 6*a* proximate the enlarging surfaces 6*c* of the electrode tips 5A and 5B, such that the leading end surfaces 6*a* and edges 6*b* of the electrode tips 5A and 5B are shaped into predetermined shapes with high accuracy.

Without considering the advantages described above, the cutter is optional, and the tip shaping apparatus M may be configured to shape the electrode tips 5 only by the shaping rollers.

Moreover, in the tip shaping apparatus M, the deburring rings (deburring section) 56, 62 and 68 are located on both ends of each of the shaping rollers 52, 58 and 64 in such a manner as to project from the outer circumference of the shaping roller in a flange-like fashion. With this configuration, the deburring rings 56, 62 and 68 support the electrode tips 5A and 5B when removing burrs 8. That is, the tip shaping apparatus M prevents wobbling of the electrode tips 5A and 5B not only during shaping operation but also at the removal of burrs, which enables secure removal of burrs 8. Further, using more than one deburring rings 56, 62 and 68 enables quick removal of burrs 8 formed on the entire circumferences of the electrode tips 5A and 5B.

The contour of the deburring rings 56, 62 and 68 should not be limited to that shown and described above.

Figure 21:
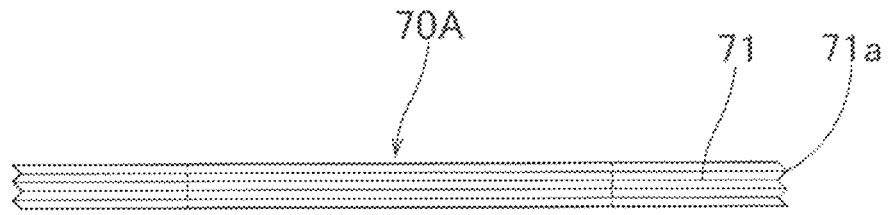
FIG. 21 is a front elevation of another embodiment of a deburring ring (deburring section)

By way of example, a deburring ring 70A shown in FIG. 21 includes on a flat outer circumference a plurality of V-grooves (or U-grooves) 71 running horizontally, thereby having a concavo-convex outer circumferential plane. This configuration will enable convex portions 71*a* in between the V-grooves 71 to shave off and remove a burr 8 when the electrode tip 5 moves toward an ejecting direction from the shaping surface of the shaping roller.

Figure 22:
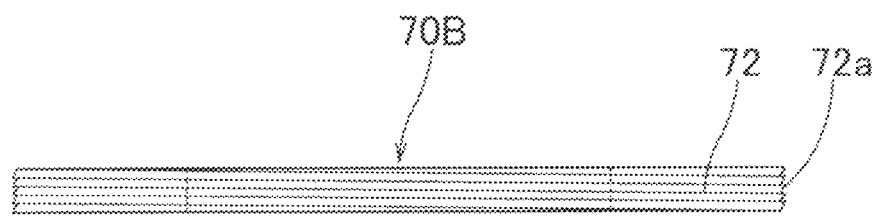
FIG. 22 is a front elevation of yet another embodiment of the deburring ring.

A deburring ring 70B shown in FIG. 22 includes a helical groove 72 comprised of a V-groove 71 as illustrated in FIG. 21. With this deburring ring 70B, too, a burr 8 will be easily removed by its convex portion 72*a*.

Figure 23:
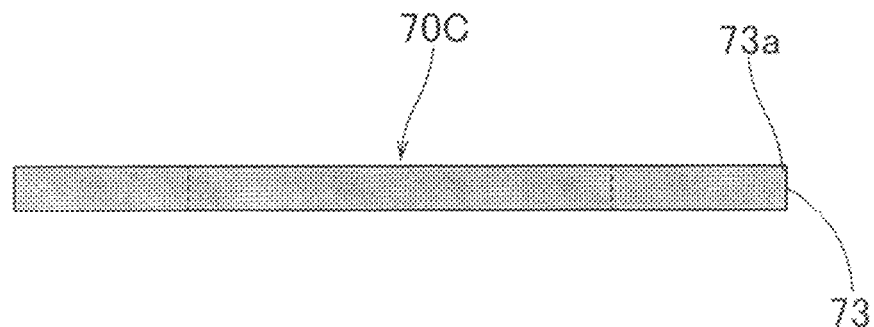
FIG. 23 is a front elevation of yet another embodiment of the deburring ring.

In a deburring ring 70C shown in FIG. 23, the outer circumferential plane is formed into a sandblasted surface 73 including a whetstone-like surface. This deburring ring 70C will chip off a burr 8 by the edge 73*a* facing the burr 8 and further grind the outer circumferential plane of the maximum diameter portion of the electrode tip 5A/5B, in other words, the outer circumferential plane of the portion of the tip 5A/5B from which the burr is removed.

Figure 24:
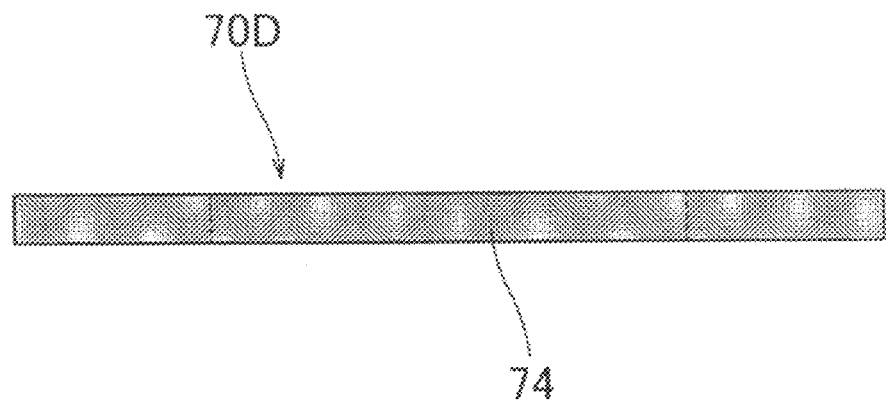
FIG. 24 is a front elevation of yet another embodiment of the deburring ring.

In a deburring ring 70D shown in FIG. 24, the outer circumferential plane is formed into a knurled surface 74. Since the knurled surface 74 has concavity and convexity, the deburring ring 70D is capable of grinding the outer circumferential plane of the portion of the electrode tip 5A/5B from which a burr is removed as well as the deburring ring 70C in FIG. 23.

Figure 25:
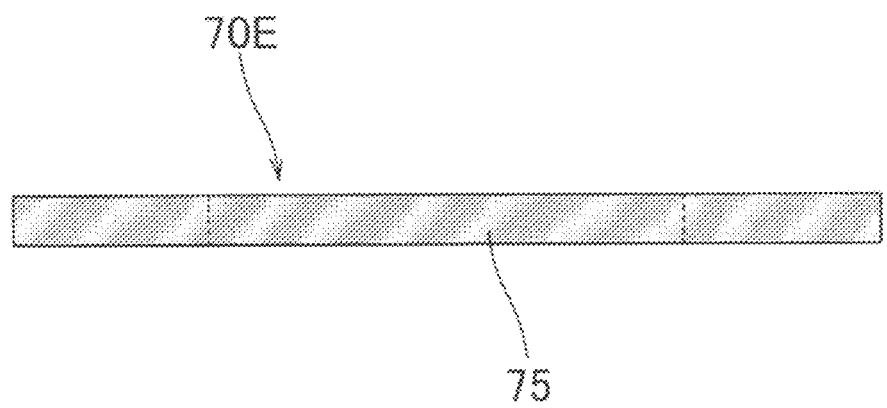
FIG. 25 is a front elevation of yet another embodiment of the deburring ring.

A deburring ring 70E shown in FIG. 25 includes on the outer circumferential plane a plurality of grooves or V-grooves 75 which extend in a slanted fashion at acute angles. This deburring ring 70E will remove a burr 8 by the same operation as those illustrated in FIGS. 21 and 22.

Figure 26:
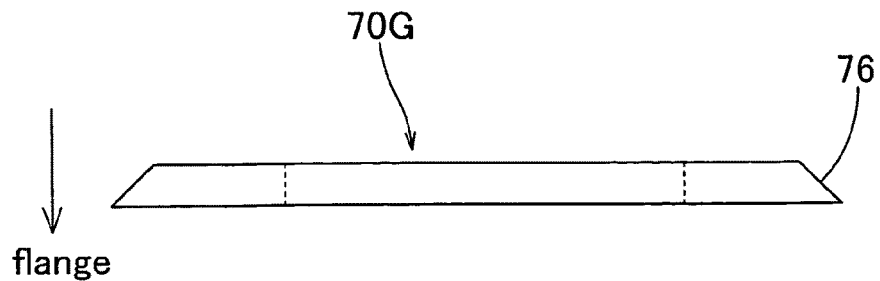
FIG. 26 is a front elevation of yet another embodiment of the deburring ring.

It will also be appreciated to form the outer circumferential plane of the deburring ring with a tapered surface. By way of example, a deburring ring 70G illustrated in FIG. 26 is so assembled with a roller body as to form a tapered surface 76 which enlarges in diameter toward the flange of the flanged bush. With this configuration, when an electrode tip 5A/5B is ejected from the shaping surface, the deburring ring 70G will shave off a burr 8 while the burr 8 passes through. This deburring ring 70G will guide the electrode tip 5A/5B out of the tip shaping apparatus M as well.

Figure 27:
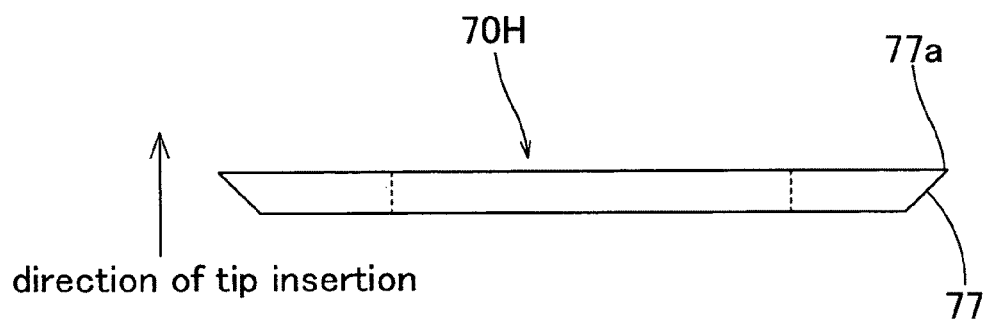
FIG. 27 is a front elevation of yet another embodiment of the deburring ring.

In a deburring ring 70H illustrated in FIG. 27, a tapered surface 77 is directed toward an opposite direction to the tapered surface 76 of the deburring ring 70G of FIG. 26. That is, the deburring ring 70H is formed with the tapered surface 77 enlarging in diameter toward a direction of insertion of the electrode tip 5A/5B into the tip shaping apparatus M, and includes an acute edge 77*a* on the side of direction of tip insertion. With this deburring ring 70H, the electrode tip 5A/5B is guided toward the shaping surface by the tapered surface 77 at the insertion, so that the tip 5A/5B is accurately guided along the rotational central axis O. Further, this configuration will make it easier to remove a burr 8 upon ejection of the electrode tip 5A/5B from the tip shaping apparatus M, by the edge 77*a* of the tapered surface 77.

Figure 28:
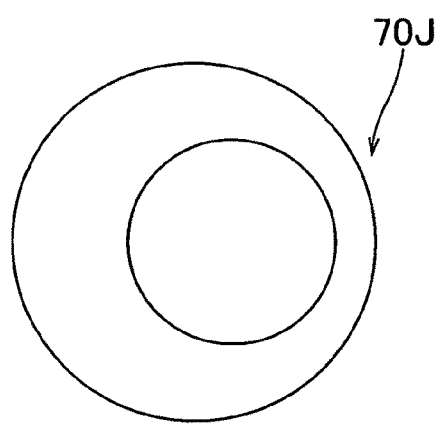
FIG. 28 is a front elevation of yet another embodiment of the deburring ring.
Figure 29:
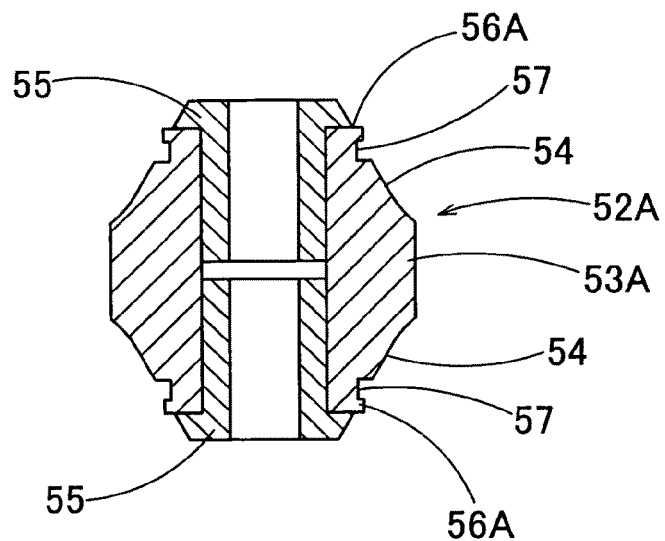
FIG. 29 is a sectional view of a shaping roller (large roller) including deburring sections as integral part thereof.
Figure 30:
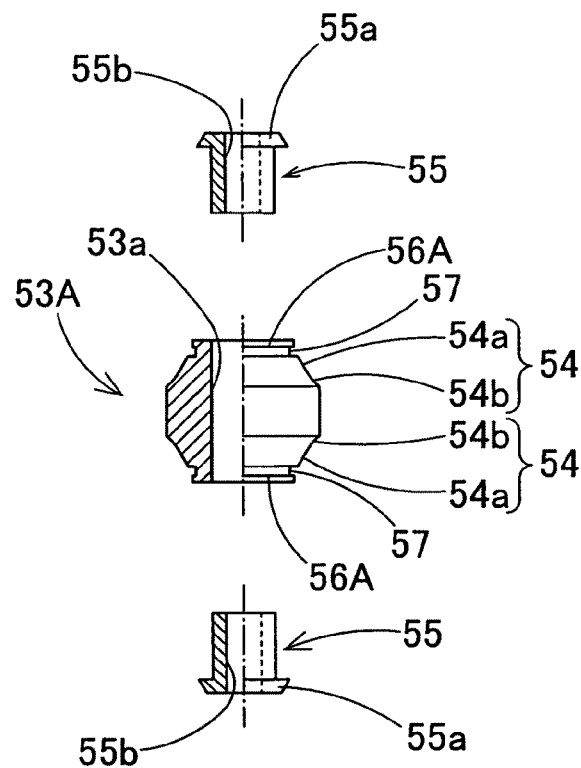
FIG. 30 is an exploded view of the same.
Figure 31:
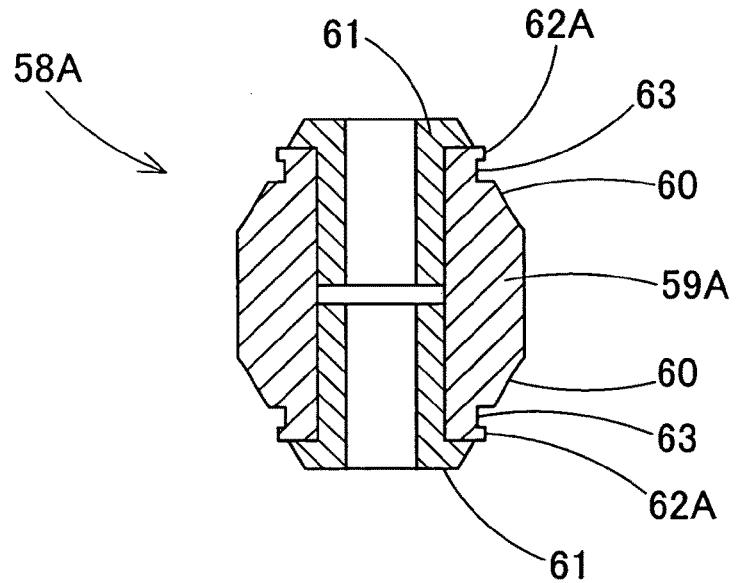
FIG. 31 is a sectional view of another shaping roller (small roller) including deburring sections as integral part thereof.
Figure 32:
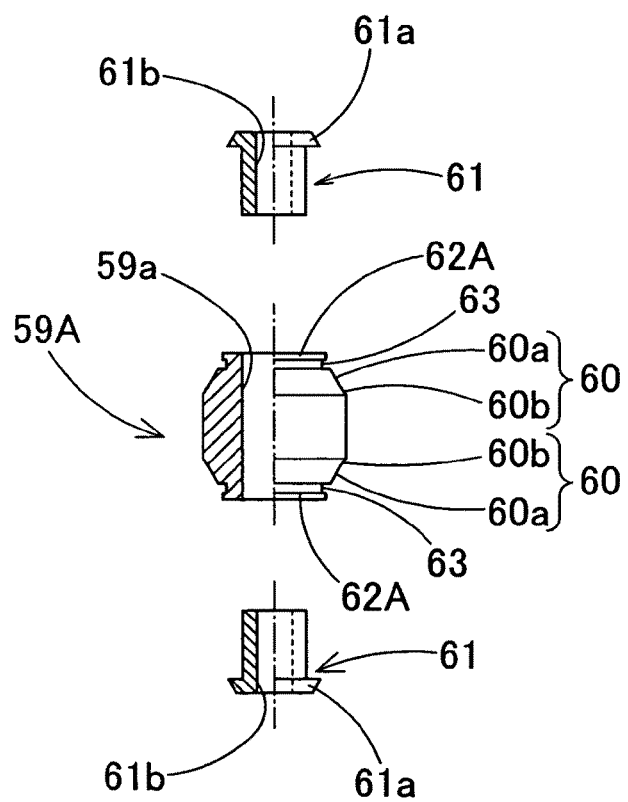
FIG. 32 is an exploded view of the same.
Figure 33:
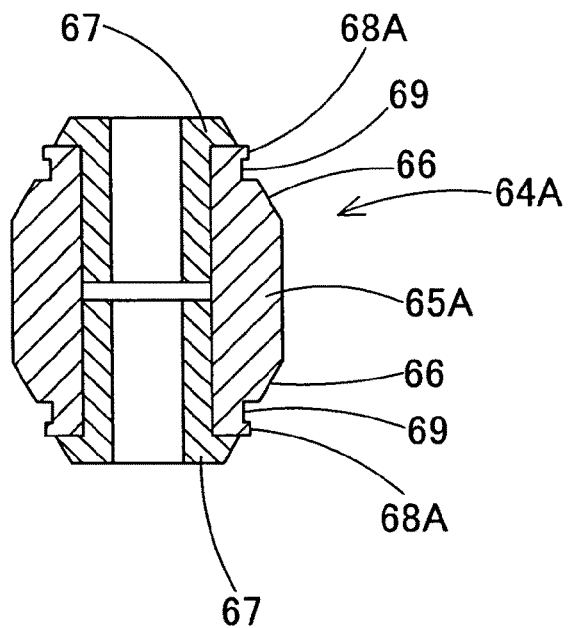
FIG. 33 is a sectional view of another shaping roller (minimal roller) including deburring sections as integral part thereof.
Figure 34:
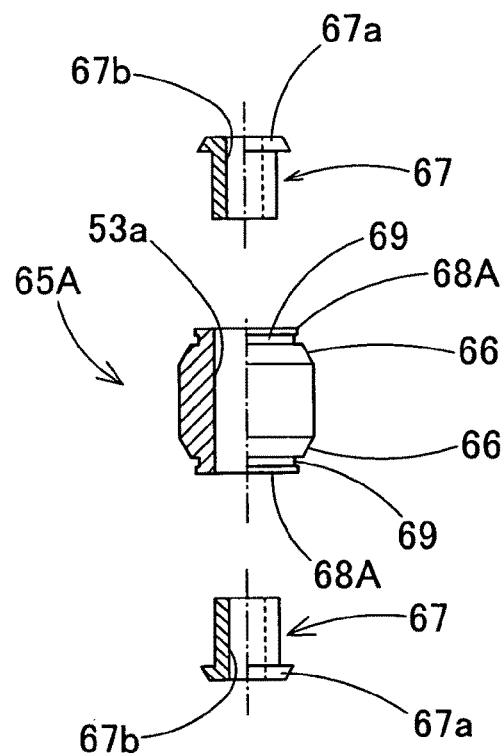
FIG. 34 is an exploded view of the same.

Moreover, a deburring ring 70J illustrated in FIG. 28 includes an eccentric inner surface on a plan view so as to be assembled into a shaping roller in an eccentric fashion. In this case, a portion on the outer circumference of the ring 70J with a maximum radius from the axial center is so located that a void space between this portion and the outer circumferential plane of the root section 7 of the electrode tip 5A/5B is 2S and below. This arrangement will enable the outer circumferential plane of the deburring ring 70J to remove a burr 8. Any configuration of those illustrated in FIGS. 21 to 27 may be applied to the outer circumferential plane of the deburring ring 70J.

In the foregoing embodiments, the deburring ring 56/62/68 is prepared as a separate entity and is assembled with the roller body 53/59/65 into the shaping roller 52/58/64. This configuration will permit replacement of the deburring ring 56/62/68 on occasions of abrasion and/or deformation.

The deburring ring may be formed integral with the roller body. By way of example, each of shaping rollers 52A/58A/64A illustrated in FIGS. 29 to 34 includes annular deburring sections 56A/62A/68A like the deburring rings 56/62/68 that project in a flange-like fashion from the outer circumferences of opposite ends of the roller body 53A/59A/65A provided with shaping surfaces 54/60/66 for shaping tip sections 6 of electrode tips 5 (5A, 5B).

Figure 36A:
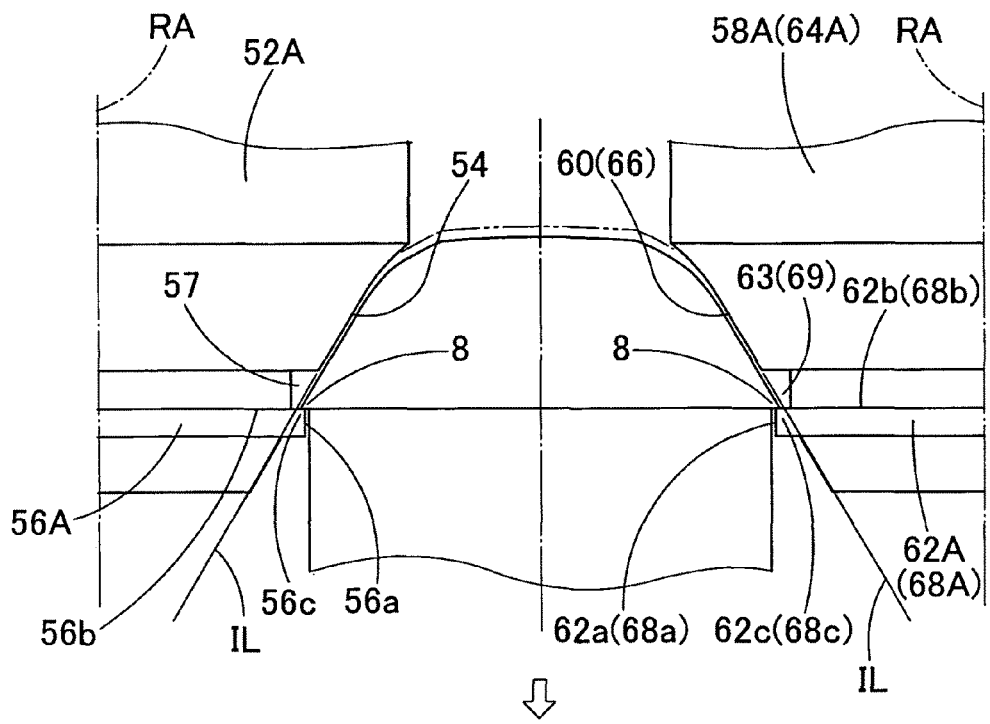
FIG. 36A is an enlarged view showing a burr contacting the deburring section of FIG. 35.
Figure 36B:
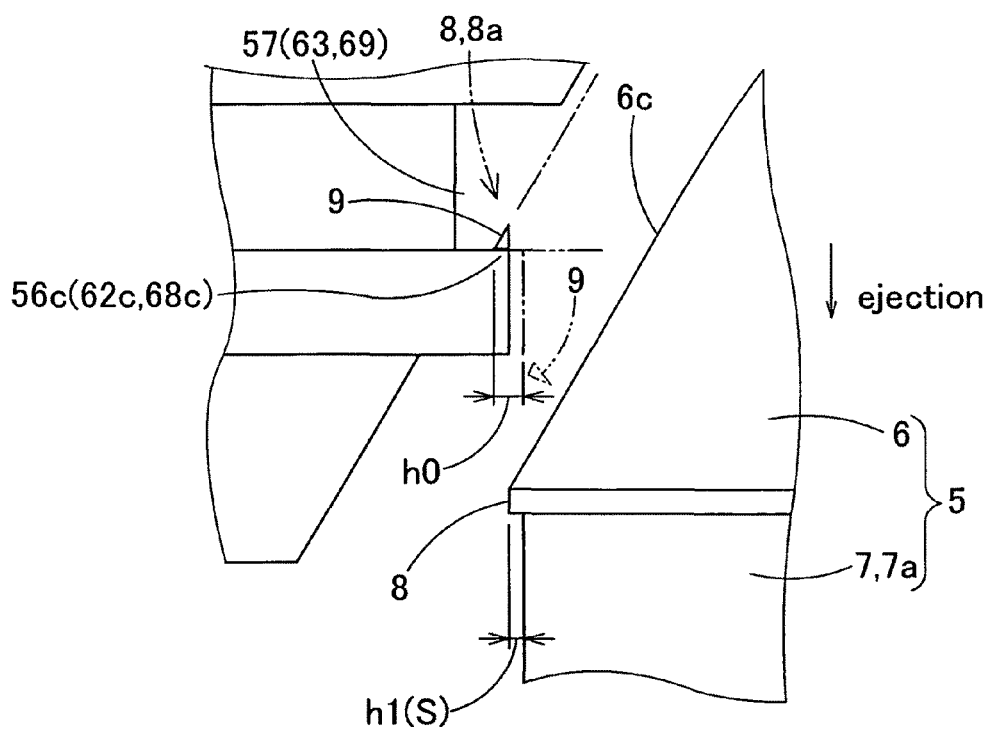
FIG. 36B is an enlarged view showing the burr removed by the deburring section by resection.
Figure 37A:
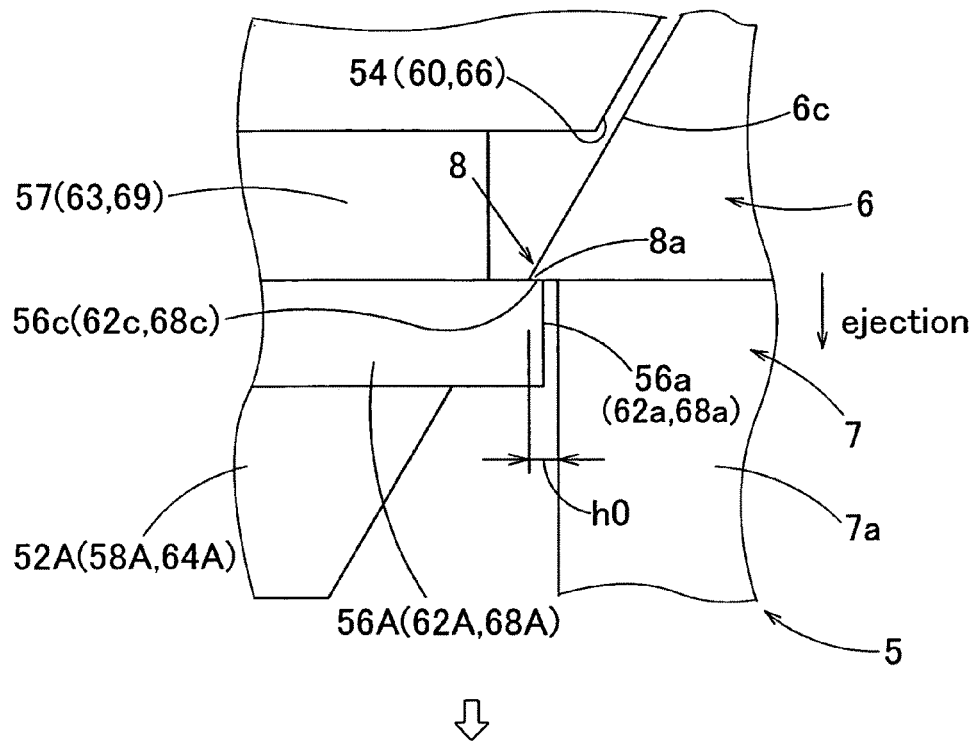
FIG. 37A is an enlarged view showing a burr contacting the deburring section of FIG. 35.
Figure 37B:
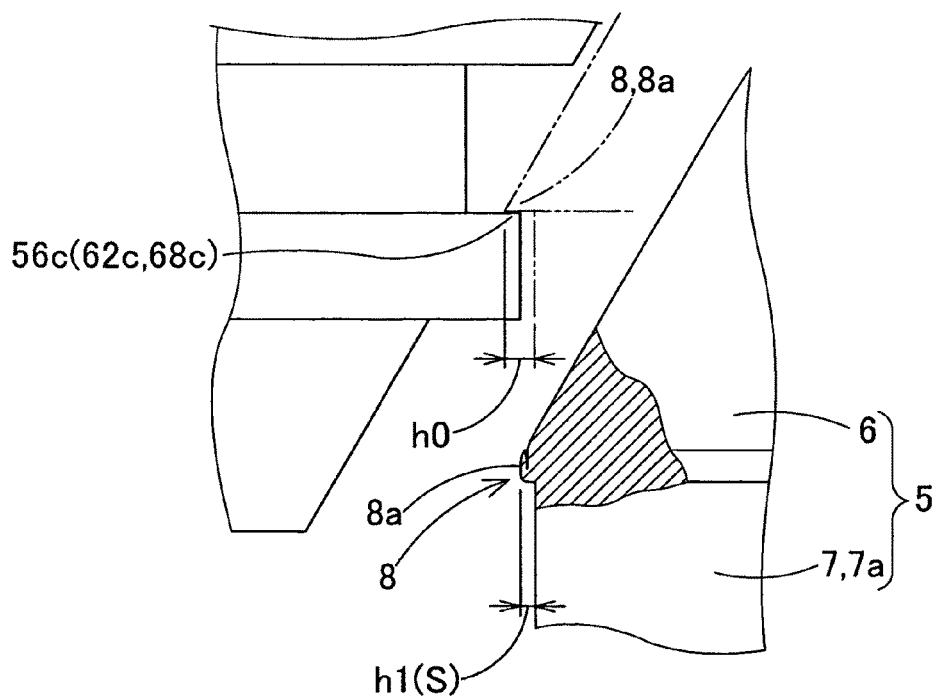
FIG. 37B is an enlarged view showing the burr removed by the deburring section by bending.

Each of the shaping rollers 52A/58A/64A includes on the outer circumferences proximate the deburring sections 56A/62A/68A on the side of the shaping surfaces 54/60/66 grooves 57/63/69 that recess toward the rotation axis RA relative to hypothetical extensions IL (refer to FIG. 36) of the shaping surfaces 54/60/66 extending toward opposite ends of the shaping rollers 52A/58A/64A. These grooves 57/63/69 serve as areas for accepting a processing tool used to apply cutting (NC turning, for example) to form the deburring sections 56A/62A/68A. Using a processing tool to form the grooves 57/63/69 on the roller body 53A/59A/65A will make it easy to form flat configurations of end faces 56b/62b/68b of the deburring sections 56A/62A/68A. Further, it will make edges 56c/66c/68c of the deburring sections 56A/62A/68A for contact with burrs 8 angular easily.

Figure 35:
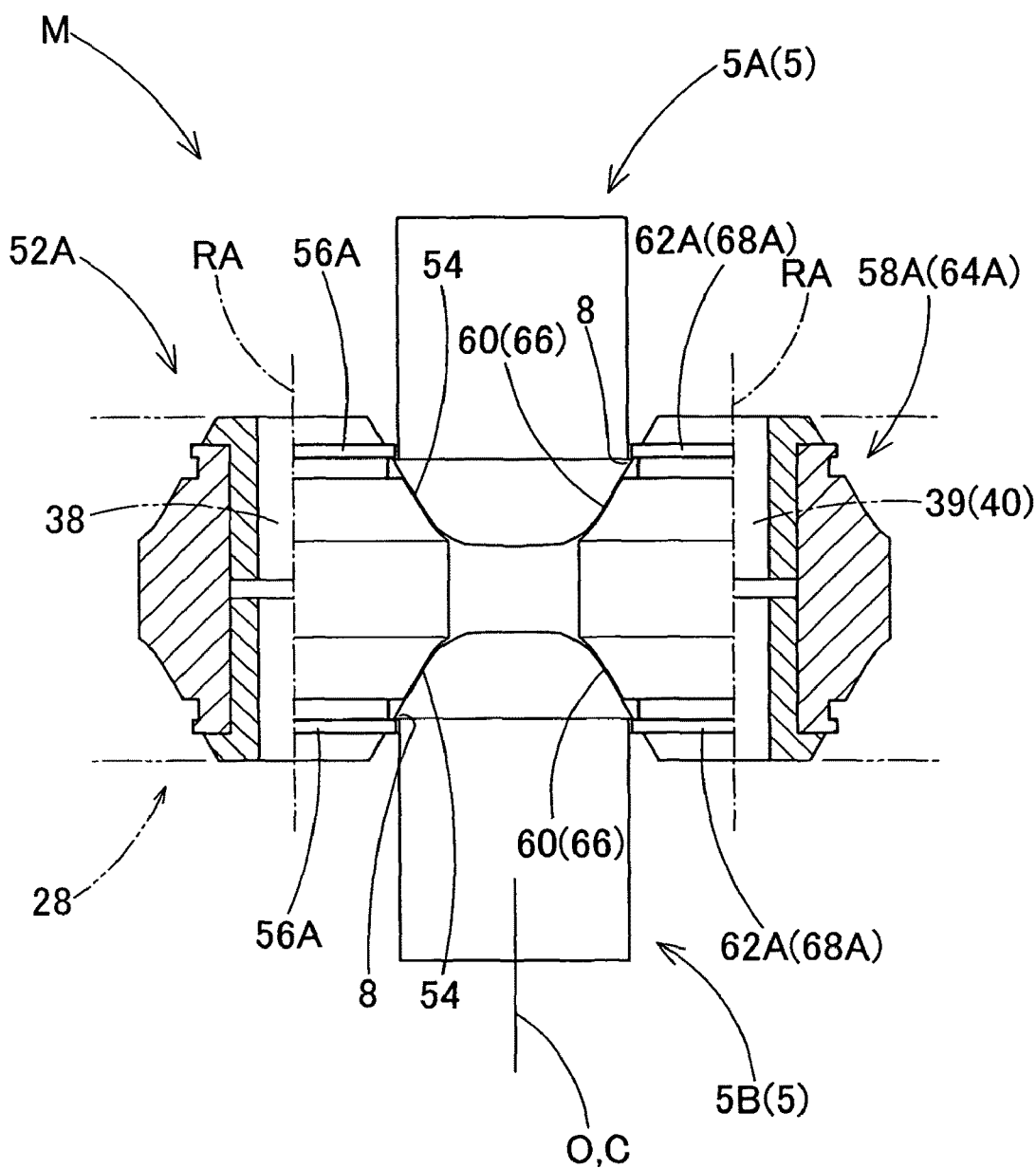
FIG. 35 is a partial section showing electrode tips which have undergone shaping and are about to be ejected from the shaping surfaces of a shaping roller of a tip shaping apparatus employing the shaping rollers shown in FIGS. 29 to 34.

When used, as the shaping rollers 52/58/64 in the foregoing embodiments, each of the shaping rollers 52A/58A/64A is put together with the flanged bushes 55/61/67 and held by the holder 28 with the holding shaft 38/39/40 (FIG. 35).

If a burr 8 is formed during shaping of electrode tip 5A/5B using a tip shaping apparatus M with these shaping rollers 52A/58A/64A, when the electrode tip 5A/5B is ejected, the deburring sections 56A/62A/68A remove the burr 8 formed on the tip 5A/5B by resection or bending in such a way as to suppress the protruding height h0 of the tip 5A/5B to height h1 (as shown in FIGS. 36A, 36B, 37A and 37B), thereby attaining the same operational advantages as the foregoing embodiment.

Moreover, the configuration that the deburring sections 56A/62A/68A are respectively integral with the roller bodies 53A/59A/65A will reduce the number of parts of each of the shaping rollers 52A/58A/64A and facilitate mounting of the shaping rollers 52A/58A/64A on the holder 28. Further, this configuration will provide a concentric arrangement of the deburring sections 56A/62A/68A and shaping surfaces 54/60/64 with high allocation accuracy and durability, and keep the deburring sections 56A/62A/68A arranged along the axial direction of the shaping rollers 52A/58A/64A in a steady fashion.

Furthermore, each of the shaping rollers 52A/58A/64A includes the grooves 57/63/69 that recess toward the rotation axis RA relative to hypothetical extensions IL of the shaping surfaces 54/60/66 extending toward opposite ends of the shaping rollers 52A/58A/64A so as to facilitate the process to make the edges 56c/62c/68c of the deburring sections 56A/62A/68A for contact with burrs 8 angular. These grooves 57/63/69 will once accommodate scrapes 9 cut off from a burr 8 so they may be evacuated therefrom after ejection of the electrode tip 5A/5B, and therefore, scrapes 9 are evacuated smoothly without damaging the electrode tip 5A/5B.

Figure 38A:
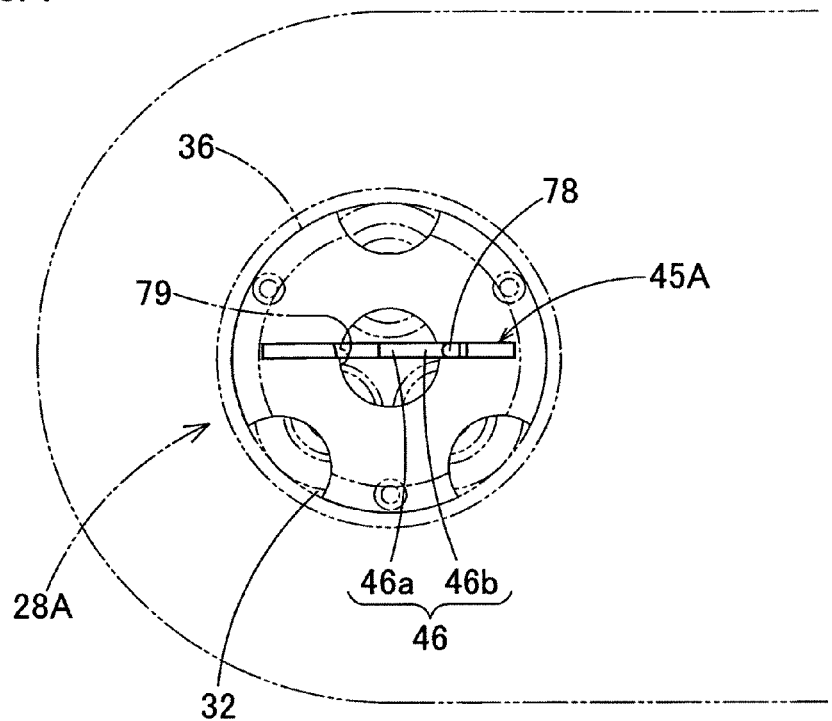
FIG. 38A is a plan view of a deburring section formed on a cutter and also shows a deburring section formed on a holder by double-dashed lines.
Figure 38B:
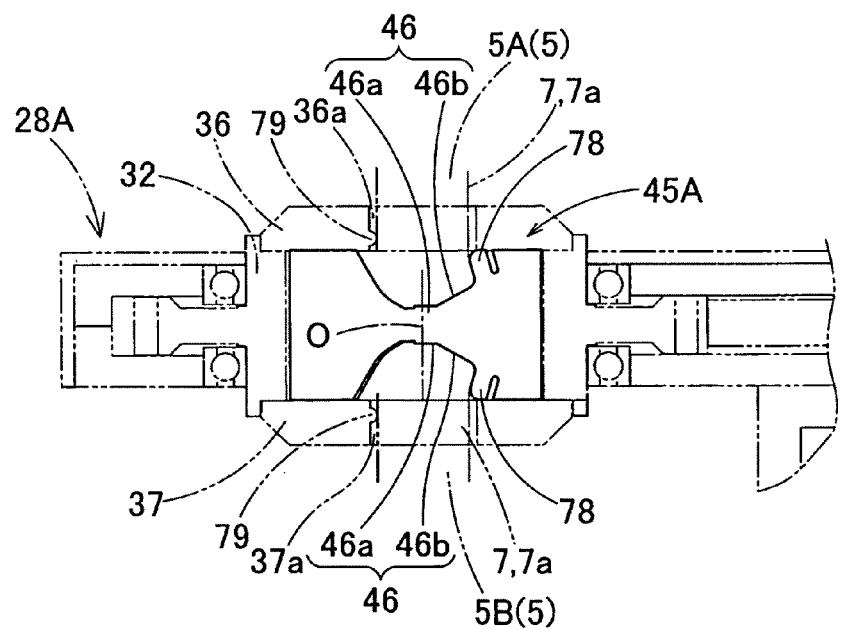
FIG. 38B is a front elevation of the deburring section formed on the cutter and also shows the deburring section formed on the holder by double-dashed lines.

The deburring section may be formed on other location than the shaping roller. By way of example, a deburring section 78 shown in FIGS. 38A and 38B is formed on the cutter 45A. The cutter 45A is formed into a generally identical contour to the cutter 45 described above and includes cutting blades 46 each of which is provided with an end surface 46a and an edge region 46b. Deburring sections 78 are located on such positions as to confront burrs when electrode tips 5A/5B are ejected from the tip shaping apparatus, and located proximate the outer circumferences 7a of the electrode tips 5A/5B undergoing shaping so as to contact with the burrs at the ejection of the electrode tips. Specifically, each of the deburring sections 78 extends outwardly from the edge region 46b and bends toward the root section 7 of the electrode tip 5A/5B. Since the cutter 45A is set in the main body 32 and rotates about the rotational central axis O together with the main body 32, each of the deburring sections 78 removes a burr 8 when the electrode tip 5A/5B is ejected from the shaping surface of the shaping roller.

Furthermore, the deburring section may be formed on the holder itself. By way of example, a holder 28A indicated by double-dashed lines in FIG. 38 includes on the inner circumferences of the insert holes 36a and 37a of the upper cover 36 and lower cover 37 each one deburring section 79. Each of the deburring section 79 is located on such a position as to confront a burr when an electrode tip 5A/5B is ejected from the tip shaping apparatus, and located proximate the outer circumference 7a of the electrode tip 5A/5B undergoing shaping so as to contact with the burr at the ejection of the electrode tip.

Providing a deburring section on a shaping roller may also be applied to such a tip shaping apparatus wherein a rotation axis of a shaping roller is perpendicular to the rotational central axis O of the holder 28 as disclosed in JP 2006-88222, not only to a tip shaping apparatus wherein the rotation axis RA of a shaping roller is located to extend along the rotational central axis O of the holder 28.

One shaping roller formed into a curved shape and provided with a deburring section may be employed for use in the tip shaping apparatus of the invention. Moreover, the number of the shaping rollers each formed into a barrel-like shape may be two or four and above.

What is claimed is:

1. A tip shaping apparatus for shaping a pair of electrode tips carried at root sections thereof by a welding gun for use in spot welding into reusable condition, each of which electrode tips being columnar in shape and including on a tip section a circular leading end surface for contact with a workpiece to be welded and an enlarging surface extending from an edge of the leading end surface to the root section while enlarging, the tip shaping apparatus comprising:

a rotatable holder coaxial with the electrode tips;

a shaping roller that is held by the holder and includes a shaping surface against which the tip section of the electrode tip is pressed to be shaped while the holder rotates; and a deburring section that is located, when the electrode tip is ejected after shaping operation, on a position confronting a burr which is formed on the electrode tip in such a manner as to project from an outer circumference of the root section of the electrode tip proximate the tip section toward a direction perpendicular to an axis of the electrode tip, wherein the deburring section is located proximate the outer circumference of the root section of the electrode tip undergoing shaping so as to contact with and cut off or bend the burr for suppressing a height of the burr from the outer circumference of the root section when the electrode tip is ejected.

2. The tip shaping apparatus of claim 1, further comprising a plurality of the shaping rollers located around a rotational central axis of the holder, each of which shaping rollers being rotatable about a rotation axis extending in parallel to the rotational central axis of the holder, wherein each of the shaping rollers is formed into a generally barrel-like shape in which the shaping surfaces are gradually reduced in diameter toward opposite ends in an axial direction of the rotation axis so as to shape the tip sections of both of the electrode tips.

3. The tip shaping apparatus of claim 1, further including a cutter held by the holder and including a cutting blade that cuts vicinities of the leading end surfaces of both of the electrode tips while the holder rotates.

4. The tip shaping apparatus of claim 2, wherein the deburring sections are located on both ends of each of the shaping rollers in such a manner as to project from an outer circumference of the shaping roller in a flange-like fashion.

5. The tip shaping apparatus of claim 4, wherein an outer circumferential plane of each of the deburring sections includes a tapered surface that enlarges in diameter toward a direction of insertion of the electrode tip and an acute edge located on a side of the direction of tip insertion.

6. The tip shaping apparatus of claim 4, wherein an outer circumferential plane of each of the deburring sections includes a grinding surface having concavity and convexity.

7. The tip shaping apparatus of claim 4, wherein each of the shaping rollers is comprised of a roller body provided with the shaping surfaces and the deburring sections prepared separate from the roller body and assembled with the roller body.

8. The tip shaping apparatus of claim 4, wherein each of the shaping rollers is comprised of a roller body provided with the shaping surfaces and the deburring sections integral with the roller body.

9. The tip shaping apparatus of claim 8, wherein each of the shaping rollers includes on the outer circumferences proximate the deburring sections on the side of the shaping surfaces grooves that recess toward the rotation axis relative to hypothetical extensions of the shaping surfaces extending toward opposite ends of the shaping rollers.

10. The tip shaping apparatus of claim 3, wherein the deburring section is located on the cutter.

11. The tip shaping apparatus of claim 1, wherein the deburring section is located on the holder.

* * * * *